(12) United States Patent
Benfold et al.

(10) Patent No.: US 12,545,509 B2
(45) Date of Patent: Feb. 10, 2026

(54) RAISING AND LOWERING CONTAINERS

(71) Applicant: Ocado Innovation Limited, Hatfield (GB)

(72) Inventors: James Benfold, Hatfield (GB); Daniel Popa, Hatfield (GB); Matthew Harman, Hatfield (GB); Vipin Pillai, Hatfield (GB); Matthew Whelan, Hatfield (GB); Wilhelm Johannisson, Hatfield (GB); Liam Harrison, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 419 days.

(21) Appl. No.: 17/794,766

(22) PCT Filed: Jan. 22, 2021

(86) PCT No.: PCT/EP2021/051531
§ 371 (c)(1),
(2) Date: Jul. 22, 2022

(87) PCT Pub. No.: WO2021/148657
PCT Pub. Date: Jul. 29, 2021

(65) Prior Publication Data
US 2023/0116001 A1    Apr. 13, 2023

(30) Foreign Application Priority Data

Jan. 24, 2020 (GB) .................................. 2001012
Mar. 4, 2020 (GB) .................................. 2003101

(51) Int. Cl.
*B65G 1/04*     (2006.01)
*B60L 58/26*    (2019.01)
(Continued)

(52) U.S. Cl.
CPC ............ *B65G 1/0464* (2013.01); *B60L 58/26* (2019.02); *B60R 16/04* (2013.01); *B65G 1/0478* (2013.01);
(Continued)

(58) Field of Classification Search
CPC .................................................. B65G 1/0464
See application file for complete search history.

(56) References Cited

U.S. PATENT DOCUMENTS

2016/0194151 A1    7/2016  Lindbo et al.
2018/0370725 A1    12/2018 Hognaland et al.
(Continued)

FOREIGN PATENT DOCUMENTS

CA        3083498 A1      7/2019
JP        2017524625 A    8/2017
(Continued)

OTHER PUBLICATIONS

GB Combined Search and Examination Report under Section 17 & 18(3), issued in corresponding Application No. GB2100903.0 dated Jul. 1, 2021.
(Continued)

*Primary Examiner* — Mark C Hageman
(74) *Attorney, Agent, or Firm* — Buchanan, Ingersoll & Rooney, PC

(57) ABSTRACT

A method and load-handling device for lifting and moving containers are disclosed, the load-handling device including: a body having an upper portion and a lower portion, the upper portion being configured to house one or more operation components, the lower portion being arranged beneath the upper portion, the lower portion including a container-receiving space for accommodating at least part of a container; and a container-lifting mechanism including a container-gripping assembly configured to releasably grip a
(Continued)

container and a raising and lowering assembly configured to raise and lower the container-gripping assembly, wherein the raising and lowering assembly including a single motor configured to raise and lower the container-gripping assembly.

17 Claims, 14 Drawing Sheets

(51) Int. Cl.
*B60R 16/04* (2006.01)
*B65G 1/06* (2006.01)
*B66C 19/00* (2006.01)
*H01M 10/613* (2014.01)
*H01M 10/625* (2014.01)
*H01M 10/6551* (2014.01)
*H01M 10/6563* (2014.01)
*H01M 10/6572* (2014.01)

(52) U.S. Cl.
CPC .............. *B65G 1/065* (2013.01); *B66C 19/00* (2013.01); *H01M 10/613* (2015.04); *H01M 10/625* (2015.04); *H01M 10/6551* (2015.04); *H01M 10/6563* (2015.04); *H01M 10/6572* (2015.04); *B65G 2201/0235* (2013.01)

(56) References Cited

U.S. PATENT DOCUMENTS

| | | |
|---|---|---|
| 2019/0225436 A1 | 7/2019 | Lindbo et al. |
| 2019/0263589 A1 | 8/2019 | Clarke et al. |
| 2020/0346864 A1 | 11/2020 | Fjeldheim et al. |
| 2020/0407160 A1 | 12/2020 | Ingram-tedd et al. |
| 2021/0078802 A1 | 3/2021 | Hognaland et al. |
| 2021/0086993 A1 | 3/2021 | Lindbo et al. |
| 2022/0041373 A1 | 2/2022 | Ingram-tedd et al. |

FOREIGN PATENT DOCUMENTS

| | | |
|---|---|---|
| WO | 2015019055 A1 | 2/2015 |
| WO | 2015193278 A1 | 12/2015 |
| WO | 2016198467 A1 | 12/2016 |
| WO | 2017129384 A1 | 8/2017 |
| WO | 2017153583 A1 | 9/2017 |
| WO | 2018060527 A1 | 4/2018 |
| WO | 2018073392 A1 | 4/2018 |
| WO | 2019137870 A1 | 7/2019 |
| WO | 2019206437 A1 | 10/2019 |

OTHER PUBLICATIONS

GB Search Report under Section 17 issued in corresponding Patent Application No. GB2100903.0 dated Jun. 30, 2021.

GB Search Report under Section 17(5), issued in corresponding Application No. GB2001012.0 dated Oct. 23, 2020.

GB Search Report under Section 17(5), issued in corresponding Application No. GB2003101.9 dated Aug. 20, 2020.

International Search Report (PCT/ISA/210) and Written Opinion (PCT/ISA/237) mailed on Apr. 29, 2021, by the European Patent Office as the International Searching Authority for International Application No. PCT/EP2021/051531. (11pages).

Final Office Action issued on Mar. 12, 2024, by the Japanese Patent Office in corresponding Japanese Patent Application No. 2022-544769, and an English Translation of the Office Action. (5 pages).

First Office Action issued on Nov. 7, 2023, by the Japanese Patent Office in corresponding Japanese Patent Application No. 2022-544769 (English Translation only). (5 pages).

Office Action issued on Oct. 5, 2023, by the Canadian Patent Office in corresponding Canadian Patent Application No. 3,168,847. (11 pages).

Office Action issued on Jul. 30, 2024, by the Canadian Patent Office in corresponding Canadian Patent Application No. 3,168,847. (8 pages).

RAISING AND LOWERING CONTAINERS

The invention relates to raising and lowering containers. In particular, it relates to load-handling devices, methods, computer-readable storage media, and storage and retrieval systems for causing raising and lowering of containers relative to a body of a load-handling device.

BACKGROUND

The claimed apparatus, methods, systems and computer programs are intended to provide improvements relating to the raising and lowering of containers relative to the bodies of load-handling devices. They are particularly, though not necessarily exclusively, intended to provide improvements relating to the raising and lowering of storage containers which may be used in conjunction with a storage structure on top of which multiple load-handling devices may move to collect or drop off storage containers in different positions relative to the storage structure.

SUMMARY

According to an embodiment, there is provided a load-handling device as described in numbered clause 1.

According to a further embodiment, there is provided a method as described in numbered clause 20.

According to a further embodiment, there is provided a computer-readable storage medium.

According to a further embodiment, there is provided a storage and retrieval system as described in numbered clause 26.

This application claims priority from UK Patent Application Nos. GB2001012.0 filed 24 Jan. 2020 and GB2003101.9 filed 4 Mar. 2020, the content of these applications hereby being incorporated by reference.

One aim of the present application is to provide a fault or failure tolerant load-handling device. Another aim of the present invention is to provide a load-handling device which is able to self-recover or at least partially self-recover if a fault or failure is detected or occurs.

A load-handling device is provided for lifting and moving storage containers stacked in a grid framework structure comprising: a first set of parallel rails or tracks and a second set of parallel rails or tracks extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, the load-handling device comprising: a body mounted on a first set of wheels being arranged to engage with the first set of parallel tracks and a second set of wheels being arranged to engage with the second set of parallel tracks, and a drive assembly for driving the load-handling device in a first direction along the first set of parallel tracks or driving the load handing device in a second direction along the second set of parallel tracks, wherein the drive assembly comprises: at least two motors for driving the first set of wheels; at least two motors for driving the second set of wheels; and a number of gear arrangements corresponding to the number of motors for transferring drive from the motor to the wheels, wherein the motors are arranged on a face perpendicular to the driven wheel and parallel to the axis of rotation of the drive wheel, and the drive shaft of the motor extends along the face.

In this way, the load handing device is able to manoeuvre along the tracks to all of the grid spaces by selectively powering or driving the first set of wheels and the second set of wheels to move in a first or x-direction or to move in a second or y-direction. The driven wheels may be driven in forward and reverse directions. The flexibility in the direction of travel and the grid pattern itself means that the load-handling device is not required to travel a specific route to a particular grid location, instead the load-handling device can manoeuvre around obstacles on the grid, for example, other load handing devices.

An advantage of the drive motors being arranged on a face perpendicular to the wheel that they are driving is that motor may be arranged within the face of the load handing device, i.e. extending across the periphery of the load-handling device. This arrangement means that the central portion of the body is left open or clear from drive motors or drive shafts, leaving a cavity. The cavity may be used for housing other components of the load handing device. Or the cavity may be used for receiving a lifted storage container, and housing a lifted storage container while the load-handling device manoeuvres on the grid to another location.

Another advantage of the arrangement of the drive motors is that the drive shaft may be significantly longer than other motor arrangements that do not extend across the load-handling device body, such as a direct drive hub motor arrangement.

It will be appreciated that by having at least two motors for driving the load-handling device in the first direction or x-direction and having at least two motors for driving the load-handling device in the second or y-direction, there is redundancy for driving the load-handling devices in both direction. Advantageously, even if there is a failure of one motor for a set of wheels, the load-handling device will still be able to "limp home" to the edge of the grid or to a repair area. Advantageously, this means that the grid may continue to be fully operational while the faulty load-handling device is recovered and repaired and reduces the needed for stoppages of grid operation while a faulty load-handling device is recovered. Advantageously this helps to ensure that the grid may operate efficiently.

The first set of wheels may comprise two wheels on a first face of the load-handling device, and two wheels on a first opposed face of the load handing device; the second set of wheels may comprise two wheels on a face of the load-handling device perpendicular to the first face of the load-handling device, and two wheels on a second opposed face of the load handing device; and at least one wheel on each face of the load-handling device may be driven by a respective motor.

The wheels without a drive motor, or un-driven wheels, may be idler wheels allowed to freely rotate when the load-handling device is driven by other wheels of the set of wheels. In this way, the number of motors required is reduced thereby saving on costs in capital, costs in space on the load-handling device, and the amount of communication and control required to synchronise the parts in order to operate the load-handling device to move around the grid.

It will be appreciated that one wheel on each side of the load-handling device is driven. The driven wheels on the opposed sides may be diagonally opposite each other to advantageously limit any twisting forces that might arise on the load-handling device when it is being drive. Accordingly, this makes it less likely that the load-handling device would wobble over the track limits and less likely that the load-handling device would tip over when being driven.

Each wheel of the first set of wheels and the second set of wheels may be driven by respective motors.

It will be appreciated that further redundancy is introduced when each of the wheels may be driven by a respective motor. Further, it will be appreciated that it may be possible to drive the load-handling device using four motors for each direction, at twice the speed compared with two motors for each direction. Still further, it will be appreciated that by driving all the wheels in each direction the possibility of introducing twisting forces on the load-handling device when it is being driven are negated.

At least one of the first set of wheels and at least one of the second set of wheels may be driven by a motor(s) powered by a first power source, and at least one of the first set of wheels and at least one of the second set of wheels may be driven by a motor(s) powered by a second power source, and the first power source and the second power source are independent or separate.

In this way, only the wheels required to be driven may be driven at any time. For example, if all of the wheels are engaged with the track then, it will be appreciated, that the load-handling device could not move in the first direction nor the second direction and therefore none of the wheels should be driven. In this arrangement, the load-handling device may be considered to be in a "parked" configuration. Alternatively the load-handling device may be considered to be parked when one set of wheels is engaged with the track, but the engaged set of wheels are not driven. Advantageously a parked configuration the load-handling device may be stopped whilst on the grid. In some circumstances it may be necessary to stop all the load-handling devices operating on the grid to reduce risk to carry out work on the grid, for example.

It will be appreciated that only the wheels required for a particular direction of travel may be driven. Advantageously, this may reduce the load on the power supply of the load-handling device.

Two of the first set of wheels and two of the second set of wheels are driven by a motors powered by a first power source, and two of the first set of wheels and at least one of the second set of wheels are driven by a motor(s) powered by a second power source. The first power source and or the second power source is sub-divided into at least two independent parts.

In this way, even if there is a fault with one power source or sub-part of a power source the load-handling device may continue to operate in a reduced capacity.

The load-handling device further may comprise means for selectively driving the first set of wheels or the second set of wheels. Thus, it is not necessary for all of the wheels to be driven at a particular time.

The load-handling device may further comprise a direction change assembly for selectively engaging the first set of wheels and or the second set of wheels respectively with the first set of tracks and the second set of tracks.

Advantageously each set of wheels may be selectively engaged with the tracks to enable movement of the load-handling device in first and second directions. The load-handling device may also be moved into a parked configuration where both the first set of wheels and the second set of wheels are engaged with the tracks.

The direction change assembly may comprise: a first set of direction change pulleys for the first set of wheels; and a second set of direction change pulleys for the second set of wheels, wherein the direction change pulleys are operate to selectively lift the first set of wheels or the second set of wheels to disengage the first set of wheels or the second set of wheels from the tracks.

In this way, the direction change assembly for each of the wheels may be arranged above the wheels and move the wheels vertically to engage and disengage the wheels with the tracks. The wheels may move relative to the body of the load-handling device. It will be appreciated, that at least some of the wheels will be engaged with the track at all times to support the body of the load-handling device.

In this way, both the first set of wheels and the second set of wheels are arranged to move in a vertical or z-direction relative to the body of the load-handling device.

The first set of pulleys and or the second set pulleys may be operated in unison for the first set of wheels or the second set of wheels, by direction a change motor for each wheel.

It will be appreciated that for the load-handling device to operate effectively and efficiently, all of the wheels in each set of wheels should be lowered and or raised, or engaged and disengaged, with the tracks in unison.

The first set of wheels and the second set of wheel may move in synchronisation relative to the body to selectively engage and disengage the wheels with the tracks.

Further, it will be appreciated that it may be an advantage to move the first set of wheels and the second set of wheels synchronously so that a direction-change operation can operate in one step. Advantageously, this may reduce the time required to engage the first set of wheels and or the second set of wheels, and thereby allow the load-handling device to operate more quickly.

The load-handling device may further comprising a lifting assembly for lifting and or lowering a storage container from and or to a storage location beneath the grid.

Thus, the load-handling device is provided means for lifting and lowering storage containers. Storage containers may be received into a cavity within the body of the load-handling device so that the container may be moved over the grid to a new location. The new location may be a different storage location or the new location may be an egress location on the grid. Alternatively, the storage container may be picked-up from an ingress location on the grid and moved to a storage location. Accordingly, the load-handling device is suitable for operating within a storage and retrieval system. The storage and retrieval system may be automated or semi-automated.

The load handing device may further comprising sensing means for: determining location on the grid; determining a fault or failure in the drive assembly; determining engagement of the first set of wheels or second set of wheels with the parallel tracks; determining a fault or failure in the direction change assembly; and/or determining engagement and or disengagement of the lifting assembly with a container.

For example, sensors means might comprise an over-temperature gauge or sensor, an over-current sensor, open circuit sensors or detectors and or short circuit detectors on each of the on the drive motors, hoist, z-hoist or lift assembly motors, direction-change motors and or gripper motors; an out of balance torque on the TGA cables or mechanism; an out of level TGA detected by sensors on the cable winding mechanism; and or an out of level TGA detected by level sensors on the TGA assembly.

A method of manoeuvring a load handing device operating on a grid framework structure is provided, the method comprising the steps of: selectively driving one or more motors to drive the first set of wheels or the second set of wheels in forward or reverse directions.

Optionally, the method may further comprise the steps of receiving a signal from a centralised control facility; selectively engaging the first set of wheels or the second set of wheels with the tracks; navigating the grid to a location specified by the centralised control facility, and/or receiving a signal from a centralised control facility; controlling the direction-change mechanism based on the received signal to: (a) engage the first set of wheels with the first set of parallel tracks; (b) engage the second set of wheels with the second set of parallel tracks; or (c) engage first and second sets of wheels with the first and second sets of parallel tracks to park the load-handling device, and/or receiving a signal from a centralised control facility; moving to a specified location on the grid; and performing a lifting operation to lift a container from a storage location beneath the grid, or performing a lowering operation to lower a container to a storage location beneath the grid.

Thus, the load handing device may controlled to carry out lifting and moving operations on a gird-based storage and retrieval system.

A grid-based storage and retrieval system is provided, the system comprising: a grid framework structure comprising: a first set of parallel rails or tracks and a second set of parallel rails or tracks extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, at least one load-handling device operating on the grid framework structure; and a centralised control utility for controlling the at least one load-handling device(s).

The at least one load-handling device may further comprise a communication means; and the centralised control utility of the storage system comprises communication means for communicating with a communication means on the at least one load-handling device.

The centralised control utility remotely monitors the condition of the at least one load-handling device. If a malfunction and or failure of the load-handling device is detected, the load-handling device may be instructed to move to a maintenance area or the edge of the grid using non-malfunctioning and non-failed means.

The centralised control utility may communicate with the at least one load-handling device operating on the grid to instruct the load-handling device to move to a specific location on the grid.

Further the load-handling device may be instructed to lift a container from a stack and move the container to another location on the grid, and/or further instructing the load-handling device to lower a container into a stack position beneath the grid.

A load-handling device is provided for lifting and moving storage containers stacked in a grid framework structure comprising: a first set of parallel rails or tracks and a second set of parallel rails or tracks extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, the load-handling device comprising: a body mounted on a first set of wheels being arranged to engage with the first set of parallel tracks and a second set of wheels being arranged to engage with the second set of parallel tracks; and a lifting assembly comprising a sling assembly arranged to support, raise and lower a load, the sling assembly comprising: a sling extending between a support mountable to the body of the load-handling device and a gripper plate for supporting the load, wherein the first end of the sling is attached to a hoist drum and the second end of the sling is attached to a hoist drum.

The lifting assembly, or TGA (tote gripper assembly), comprises a sling. The sling may comprise lifting tapes or wires. In normal use, typically both ends of the sling would be spooled or wound and unspooled or unwound in order to lift and lower the load. Advantageously, just one end of the sling may be spooled or unspooled allowing the lifting assembly to continue to be operational with only one hoist drum operational.

The first end of the sling may be attached to a first hoist drum and the second end of the sling is attached to a second hoist drum, and the first hoist drum is driven by a first motor and the second hoist drum is driven by a second motor.

The hoist drums may be independently operable to advantageously provide redundancy to the lifting assembly. Advantageously this may allow the load-handling device to continue operating even with a fault or reduced power. It will be appreciated that this may mean that the lifting and lowering operation takes more time than under normal circumstances but allows the lifting and lowering operation to be completed despite the fault or reduced power.

Both the first end of the sling and the second end of the sling may be attached to the same hoist drum, and the hoist drum is driven by one or more motors. The first motor and second motors me be independently powered by respective power supplies. The lifting assembly may comprise at least two sling assemblies.

In some arrangements, both ends of the sling may be attached to the same hoist drum. This arrangement has the advantage of taking less space. In addition, less control and communication facilities/volume may be required. This may additionally make inserting and removing the lifting assembly, and/or removing other components of the load-handling device through or around the lifting assembly, easier. In some arrangements the drum may be operated by more than one motor to provide redundancy. In normal operation this would mean that a greater load could be lifted and lowered. In other circumstances, for example when a motor or power supply has a fault, then the lifting assembly may continue to be operational.

A load-handling device is provided for lifting and moving storage containers stacked in a grid framework structure comprising: a first set of parallel rails or tracks and a second set of parallel rails or tracks extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, the load-handling device comprising: a body mounted on a first set of wheels being arranged to engage with the first set of parallel tracks and a second set of wheels being arranged to engage with the second set of parallel tracks; and a lifting assembly comprising: a disc hoist drum mounted on a support mountable to the body of the load-handling device and for spooling one or more tapes; and a gripper plate for supporting a load, wherein the one or more tapes extend between the disc drum and the gripper plate.

In some arrangements, the drum may be mounted so that it appears as a disc from above i.e. with the drum axis in the z- or vertical direction. In this arrangement, the drum may have a much larger diameter than would be possible to accommodate if it were arranged with the axis in the x,y plane. Having a large diameter drum means that the drum may be directly driven by a small high RPM motor without the need for step-down gearing.

The disc drum may be driven by a single motor. The single motor may be a direct drive worm gear transfer to the disc drum, or wherein the single motor is a direct drive pulley gear transfer to the disc drum.

Advantageously, using a single motor may reduce the cost (space and capital). Using a worm gear advantageously means that the drum may be directly driven, and that the motor may be arranged in the same plane as the drum. Further, using a worm gear arrangement enables more than one motor to be arranged around the drum, and advantageously provides redundancy.

The sling or one or more tapes may be arranged in a pulley system.

A pulley system may be used to reduce the force required to lift and lower the load. Advantageously, thinner tapes or wires may be used to lift a load that would otherwise require a much stronger tape.

The lifting assembly may further comprise at least one guide or guide-roller mounted on the gripper plate. One or more of guide-rollers may be powered assistant guide-rollers. The gripper plate has at least one sensor for detecting the balance of the gripper plate and or load attached to the gripper plate.

Guides and guide rollers may assist in ensuring durable operation of the lifting assembly and load-handling device by ensuring that lifting tapes or wires remain in the correct position and that spooling is neat and remains compact.

Power assistant guide-rollers may reduce the load requirement on the drum motors. Further, power assistant guide-rollers may be used to keep the load level, for example, when the load is unevenly distributed, or for example, when there is more than one drum motor and they are unevenly matched.

One or more of the guide-rollers may be movable tensioning guide-rollers.

A tensioning roller may be used to keep the lifting tape taut, especially when the rate or direction of lifting is changed.

The lifting assembly may be under control of the load-handling device. The gripper plate may have at least one sensor for detecting the balance of the gripper plate and or load attached to the gripper plate. The gripper plate may comprise at least one gripper assembly, or wherein the gripper plate comprises two or more gripper assemblies, preferably wherein the gripper plate comprises four gripper assemblies. The gripper assembly(ies) may be arranged to correspond positionally to latch recesses on a storage container. The gripper assembly may further comprise guides and or guide rollers mounted on the load-handling device for guiding the sling or tapes.

A method of using a load-handling device is provided for lifting and moving storage containers stacked in a grid framework according to any preceding claim, the method comprising the steps of: receiving a signal from a centralised control facility to perform a lifting operation, manoeuvring the load-handling device to the lift location, lowering the gripper plate to insert grippers into cooperating recesses of a container; causing the grippers to latch to the container; and lifting the gripper plate and container into the cavity of the load-handling device or lowering the gripper plate and container until the container is supported beneath; causing the grippers to release to the container; and lifting the gripper plate into the cavity of the load-handling device.

A load-handling device for lifting and moving storage containers stacked in a grid framework structure is provided. The load-handling device comprises: a first set of parallel rails or tracks and a second set of parallel rails or tracks extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, the load-handling device comprising: a body mounted on a first set of wheels being arranged to engage with the first set of parallel tracks and a second set of wheels being arranged to engage with the second set of parallel tracks, and a gripper assembly for latching to a storage container, wherein the gripper assembly comprises a deformable flexure mechanism movable between a locked configuration and a release configuration.

The gripper assembly may be self-locking.

The load-handling device may grip onto storage containers and lift storage containers. The gripper assembly is stable in at least two configurations, and is self-locking in at least the locked configuration. The gripper operates below the fatigue limit of the material and is repeatedly movable between positions. In this way, the load-handling device is able to securely and reliably grip a storage container for lifting and moving the storage container.

The bi-stable flexure may comprise: an actuator; two or more gripper-arms having hook-ends; and a number of hinge arrangements, the number of hinge arrangements corresponding to the number of gripper arms, wherein each hinge arrangement is deformable and connects the respective gripper-arms to the actuator. The hinge arrangements comprise a fulcrum, and first and second deformable sections connect to respective ends of the fulcrum. The fulcrum is substantially triangular. In the locked configuration the fulcrum engages with the gripper-arm and the compliant mechanism is open or wide; and in the release configuration the first and second sections of the hinge are flexed and the compliant mechanism is closed or narrow.

The hook-ends of the gripper arms allow the gripper to latch on to a cooperating part of a storage container, and the fulcrum means that the flexure is not able to move past the stable locked position without failure of the gripper. Thus, the configuration of the gripper assembly itself ensures that the gripper is reliably securable to the storage container for the purpose of lifting and moving the storage container.

The hinge arrangements may be connected to the gripper-arms spaced apart from the hook-ends and the fulcrum may extend above the line between the first and second hinge arrangements, or the fulcrum extends below the line between the first and second hinge arrangements. The gripper assembly may comprise two or more flexure mechanisms. The gripper assembly may comprise four flexure mechanisms.

It will be appreciated that the specific arrangement will depend on the intended use of the gripper assembly, and the intended scope is not limited to the specific examples disclosed herein.

The load-handling device may further comprise a means for lifting storage containers, wherein the means for lifting storage containers comprises a gripper plate and the gripper assembly is mounted on the gripper plate. The means for lifting storage containers may be releasably mountable on the body of the load-handling device. Lifting tapes may be attached to the gripper-arms.

The flexure mechanism may be 3-D printed.

A grid-based storage and retrieval system is provided, the system comprising: a grid framework structure comprising: a first set of parallel rails or tracks and a second set of parallel rails or tracks extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, at least one load-handling device operating on the grid framework structure; and a centralised control utility for controlling the at least one load-handling device(s).

The at least one load-handling device may further comprise a communication means; and the centralised control utility of the storage system comprises communication means for communicating with a communication means on the at least one load-handling device.

The centralised control utility remotely monitors the condition of the at least one load-handling device.

If a malfunction and or failure of the load-handling device is detected, the load-handling device may be instructed to move to a maintenance area or the edge of the grid using non-malfunctioning and non-failed means.

The centralised control utility may communicate with the at least one load-handling device operating on the grid to instruct the load-handling device to move to a specific location on the grid.

Further the load-handling device may be instructed to lift a container from a stack and move the container to another location on the grid, and/or further instructing the load-handling device to lower a container into a stack position beneath the grid.

The raising and lowering assembly may comprise a plurality of spools, each spool of the plurality of spools carrying a lifting tether having a first end anchored to the container-gripping assembly and a second end anchored to the spool, the plurality of spools driven by the single motor via the plurality of timing pulleys, timing belts, and/or gears to raise and lower the container-gripping assembly.

The plurality of spools may comprise a first set of spools and a second set of spools, wherein the first set of spools are mounted to the shaft such that the shaft is common to the first set of spools, wherein the shaft is rotated by being connected to the single motor via at least one of the plurality of timing pulleys, timing belts and/or gears, and wherein the second set of spools are driven by the single motor by being connected to the shaft via one or more of the plurality of timing pulleys, timing belts, and/or gears.

The plurality of timing pulleys may comprise a drive pulley and a first set and second set of timing pulleys, the drive pulley and the first set of timing pulleys are mounted on the shaft common to the first set of spools such that rotation of the shaft by the single motor by connection to the drive pulley drives the first set of spools. For the purpose of the present invention, the term "drive" is construed to mean driving in the sense of rotation.

The first set of timing pulleys may be connected to the second set of timing pulleys via one or more of the plurality of timing belts such that rotation of the shaft by the single motor by connection to the drive pulley drives the second set of spools.

The drive pulley may be one of the first set of pulleys. This removes the need to have a separate drive pulley as the drive pulley can form part of one of the first set of pulleys mounted on the rotatable shaft.

At least one timing pulley of the plurality of timing pulleys may be mounted to at least one spool of the plurality of spools. At least one of the plurality of spools may comprise an adjustable mechanism for rotatably adjusting the at least one spool about its axis of rotation relative to the at least one timing pulley of the plurality of timing pulleys. Alternatively, at least one timing pulley of the plurality of timing pulleys may be integral with at least one spool of the plurality of spools, i.e. formed as a single body. However, the advantage of mounting the timing pulley to the spool is that an adjustable mechanism can be incorporated into the spool so as to make fine adjustments to the spool relative to the timing pulley and/or shaft on which it is mounted. For example, when the spool is bolted onto the pulley, the adjustable mechanism can be in the form of a slot such that the mounting between the spool and the timing pulley can be rotatably adjusted relative to each other so as to make fine adjustments to the angular position of the spool on the shaft. Since the container gripper assembly is suspended by a plurality of lifting tethers (e.g. tapes), more specifically at each corner of the container gripper assembly, it is important that the container gripper assembly is kept horizontal when engaging with a container otherwise the container gripper assembly may fail to properly engage with the container. To ensure that the container gripper assembly is kept horizontal, the length of the lifting tethers extending between the plurality of spools and the container gripper assembly should be substantially equal. The adjustable mechanism allows the angular position of one or more spools relative to its respective timing pulley to be adjusted and thereby, adjusting the length of the lifting tether extending between the spool and the container gripper assembly.

The single motor may drive the first set of spools and the second set of spools in synchronisation.

BRIEF DESCRIPTION OF THE DRAWINGS

The raising and lowering of containers will now be described in detail with reference to examples, in which:

FIG. 6b schematically illustrates an example of the connection between the spools and timing pulleys of the example of FIG. 6a.

DETAILED DESCRIPTION

The following embodiments represent the applicant's preferred examples of how to implement raising and lowering of containers by a load-handling device, but they are not necessarily the only examples of how that could be achieved.

Figure 1:
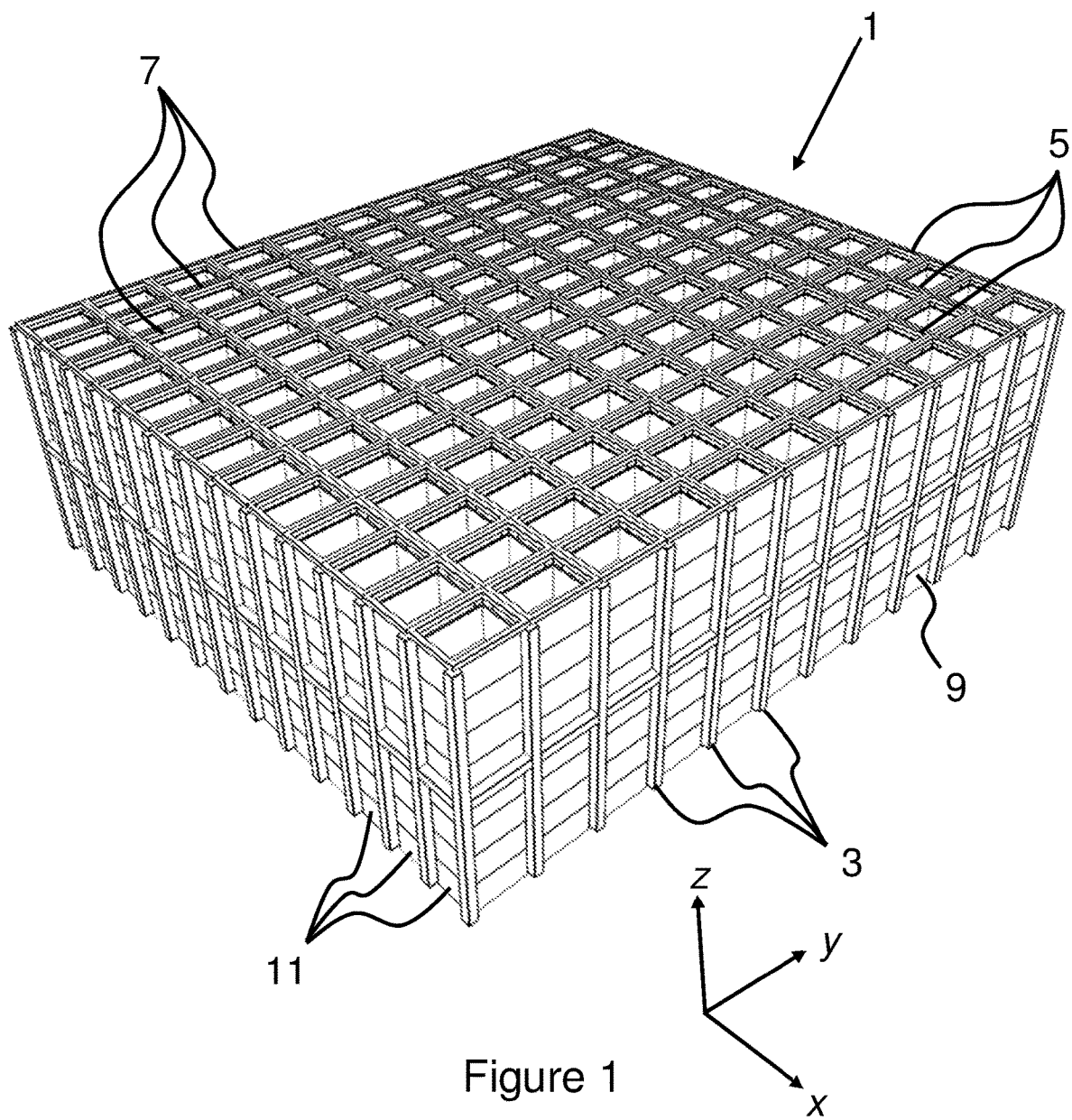
FIG. 1 schematically illustrates a storage structure and containers.

FIG. 1 illustrates a storage structure 1 comprising upright members 3 and horizontal members 5, 7 which are supported by the upright members 3. The horizontal members 5 extend parallel to one another and the illustrated x-axis. The horizontal members 7 extend parallel to one another and the illustrated y-axis, and transversely to the horizontal members 5. The upright members 3 extend parallel to one another and the illustrated z-axis, and transversely to the horizontal members 5, 7. The horizontal members 5, 7 form a grid pattern defining a plurality of grid cells. In the illustrated example, containers 9 are arranged in stacks 11 beneath the grid cells defined by the grid pattern, one stack 11 of containers 9 per grid cell.

Figure 2:
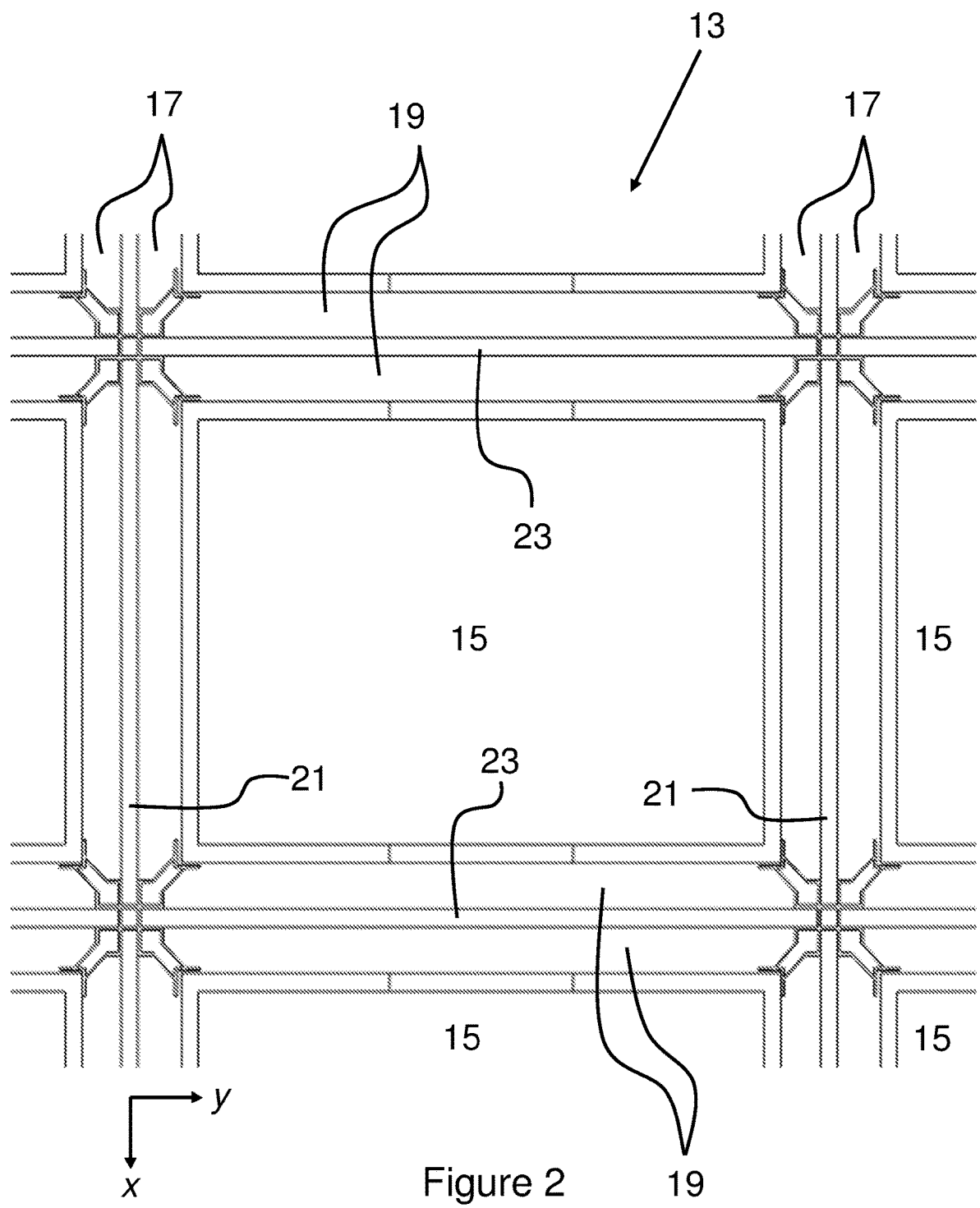
FIG. 2 schematically illustrates track on top of the storage structure illustrated in FIG. 1.

FIG. 2 shows a large-scale plan view of a section of track structure 13 forming part of the storage structure 1 illustrated in FIG. 1 and located on top of the horizontal members 5, 7 of the storage structure 1. The track structure 13 may be provided by the horizontal members 5, 7 themselves (e.g. formed in or on the surfaces of the horizontal members 5, 7) or by one or more additional components mounted on top of the horizontal members 5, 7. The illustrated track structure 13 comprises x-direction tracks 17 and y-direction tracks 19, i.e. a first set of tracks 17 which extend in the x-direction and a second set of tracks 19 which extend in the y-direction, transverse to the tracks 17 in the first set of tracks 17. The tracks 17, 19 define apertures 15 at the centres of the grid cells. The apertures 15 are sized to allow containers 9 located beneath the grid cells to be lifted and lowered through the apertures 15. The x-direction tracks 17 are provided in pairs separated by channels 21, and the y-direction tracks 19 are provided in pairs separated by channels 23.

Figure 3:
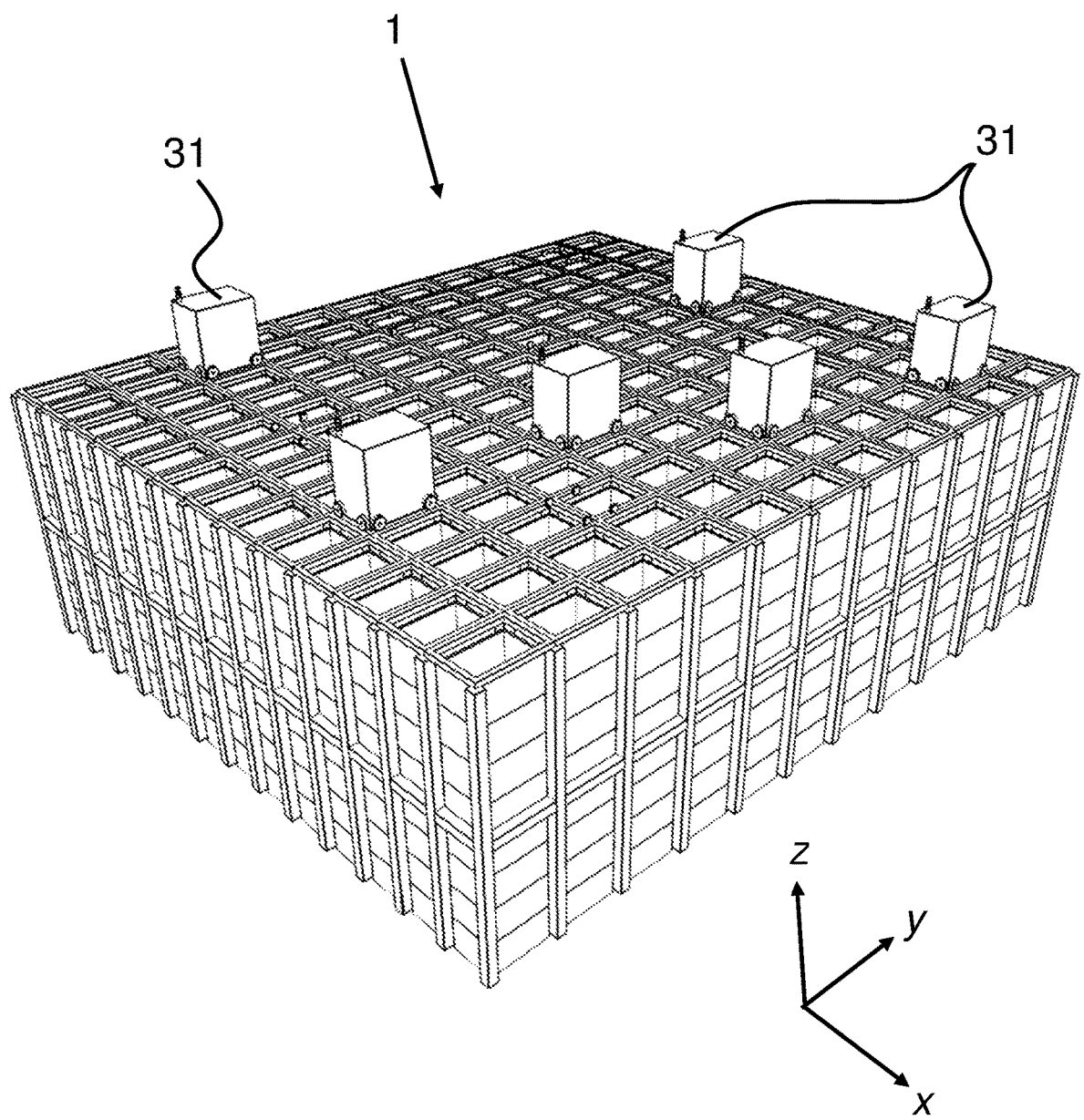
FIG. 3 schematically illustrates load-handling devices on top of the storage structure illustrated in FIG. 1.

FIG. 3 shows a plurality of load-handling devices 31 moving on top of the storage structure 1 illustrated in FIG. 1. The load-handling devices 31, which may also be referred to as robots 31 or bots 31, are provided with sets of wheels to engage with corresponding x- or y-direction tracks 17, 19 to enable the bots 31 to travel across the track structure 13 and reach specific grid cells. The illustrated pairs of tracks 17, 19 separated by channels 21, 23 allow bots 31 to occupy (or pass one another on) neighbouring grid cells without colliding with one another.

Figure 4:
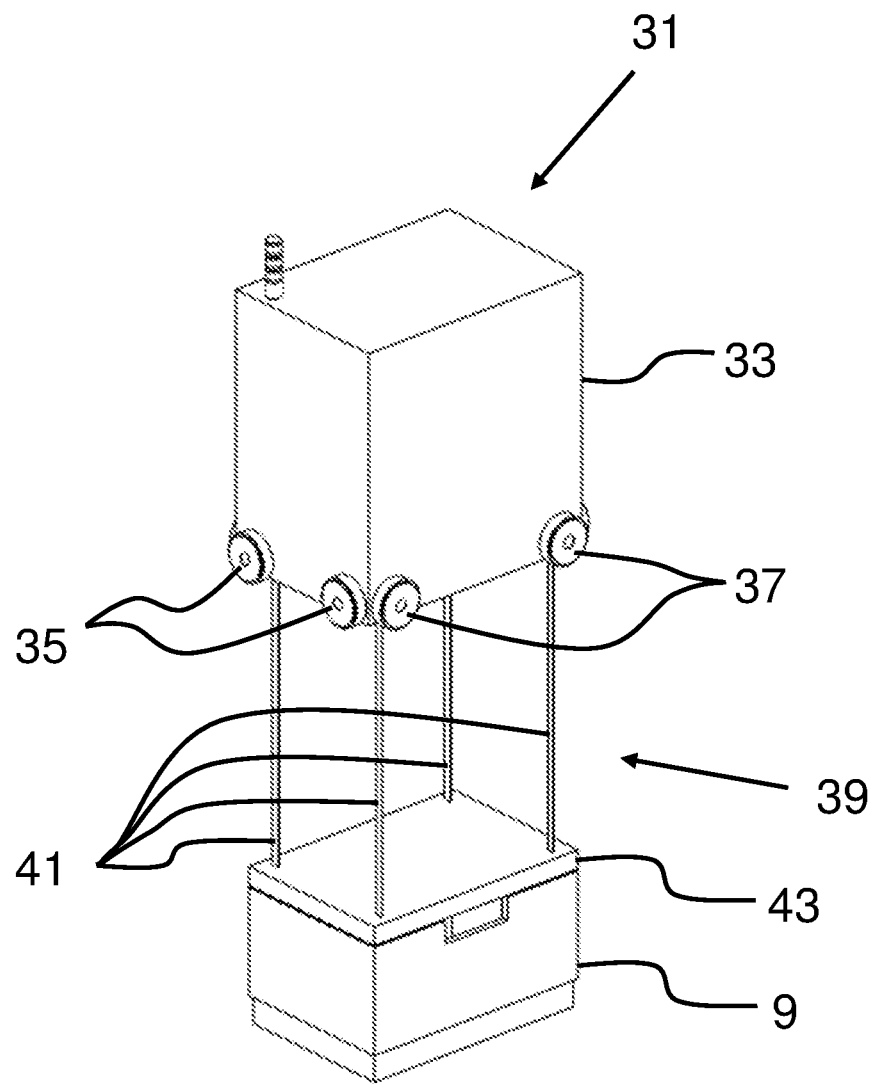
FIG. 4 schematically illustrates a single load-handling device with container-lifting means in a lowered configuration.

As illustrated in detail in FIG. 4, a bot 31 comprises a body 33 in or on which are mounted one or more components which enable the bot 31 to perform its intended functions. These functions may include moving across the storage structure 1 on the track structure 13 and raising or lowering containers 9 (e.g. from or to stacks 11) so that the bot 31 can retrieve or deposit containers 9 in specific locations defined by the grid pattern.

The illustrated bot 31 comprises first and second sets of wheels 35, 37 which are mounted on the body 33 of the bot 31 and enable the bot 31 to move in the x- and y-directions, respectively, along the tracks 17 and 19, respectively. In particular, two wheels 35 are provided on the shorter side of the bot 31 visible in FIG. 4, and a further two wheels 35 are provided on the opposite shorter side of the bot 31 (side and further two wheels 35 not visible in FIG. 4). The wheels 35 engage with tracks 17 and are rotatably mounted on the body 33 of the bot 31 to allow the bot 31 to move along the tracks 17. Analogously, two wheels 37 are provided on the longer side of the bot 31 visible in FIG. 4, and a further two wheels 37 are provided on the opposite longer side of the bot 31 (side and further two wheels 37 not visible in FIG. 4). The wheels 37 engage with tracks 19 and are rotatably mounted on the body 33 of the bot 31 to allow the bot 31 to move along the tracks 19.

The bot 31 also comprises a container-lifting mechanism 39 configured to raise and lower containers 9. The illustrated container-lifting mechanism 39 comprises four lifting tapes or reels 41 which are connected at their lower ends to a container-gripping assembly 43. The container-gripping assembly 43 comprises gripping means (which may, for example, be provided at the corners of the assembly 43, in the vicinity of the tapes 41, or in another location on the container-gripping assembly 43, depending on the required performance) configured to engage with features of the containers 9. For instance, the containers 9 may be provided with one or more apertures in their upper sides with which the gripping means can engage. The gripping means may be configured to hook under the rims or lips of the containers 9, and/or to clamp or grasp the containers 9. The tapes 41 may be wound up or down to raise or lower the gripping assembly, as required.

Figure 5:
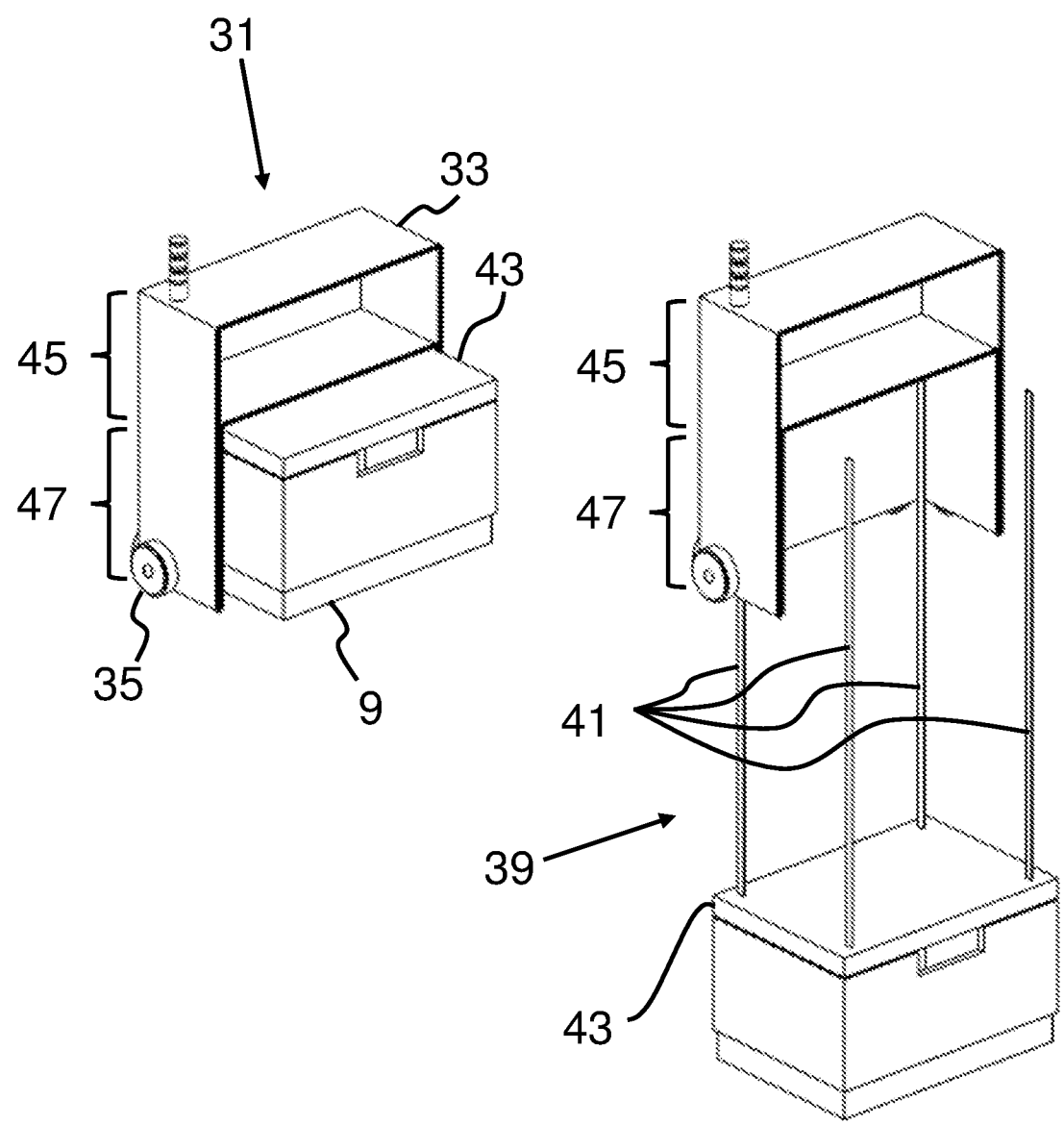
FIG. 5 schematically illustrates cutaway views of a single load-handling device with container-lifting means in a raised and a lowered configuration.

As can be seen in FIG. 5, the body 33 of the bot 31 includes an upper portion 45 and a lower portion 47 provided below the upper portion 45. The upper portion 45 is configured to house operation components of the bot 31, such as one or more control components for controlling movement of one or more of the wheels 35, 37. The lower portion 47 provides a space or cavity for receiving a container 9. The cavity is sized such that enough of a container 9 can fit inside the cavity to enable the bot 31 to move across the track structure 13 on top of storage structure 1 without the underside of the container 9 catching on the track structure 13 or another part of the storage structure 1. When the bot 31 has reached its intended destination, the container-lifting mechanism 39 controls the tapes 41 to lower the container-gripping assembly 43 and the corresponding container 9 out of the cavity in the lower portion 47 and into the intended position. The intended position may be a stack 11 of containers 9 or an egress point of the storage structure 1 (or an ingress point of the storage structure 1 if the bot 31 has moved to collect a container 9 for storage in the storage structure 1). Although in the illustrated example the upper and lower portions 45, 47 are separated by a physical divider, in other embodiments, the upper and lower portions 45, 47 may not be physically divided by a specific component or part of the body 33 of the bot 31.

Figure 6:
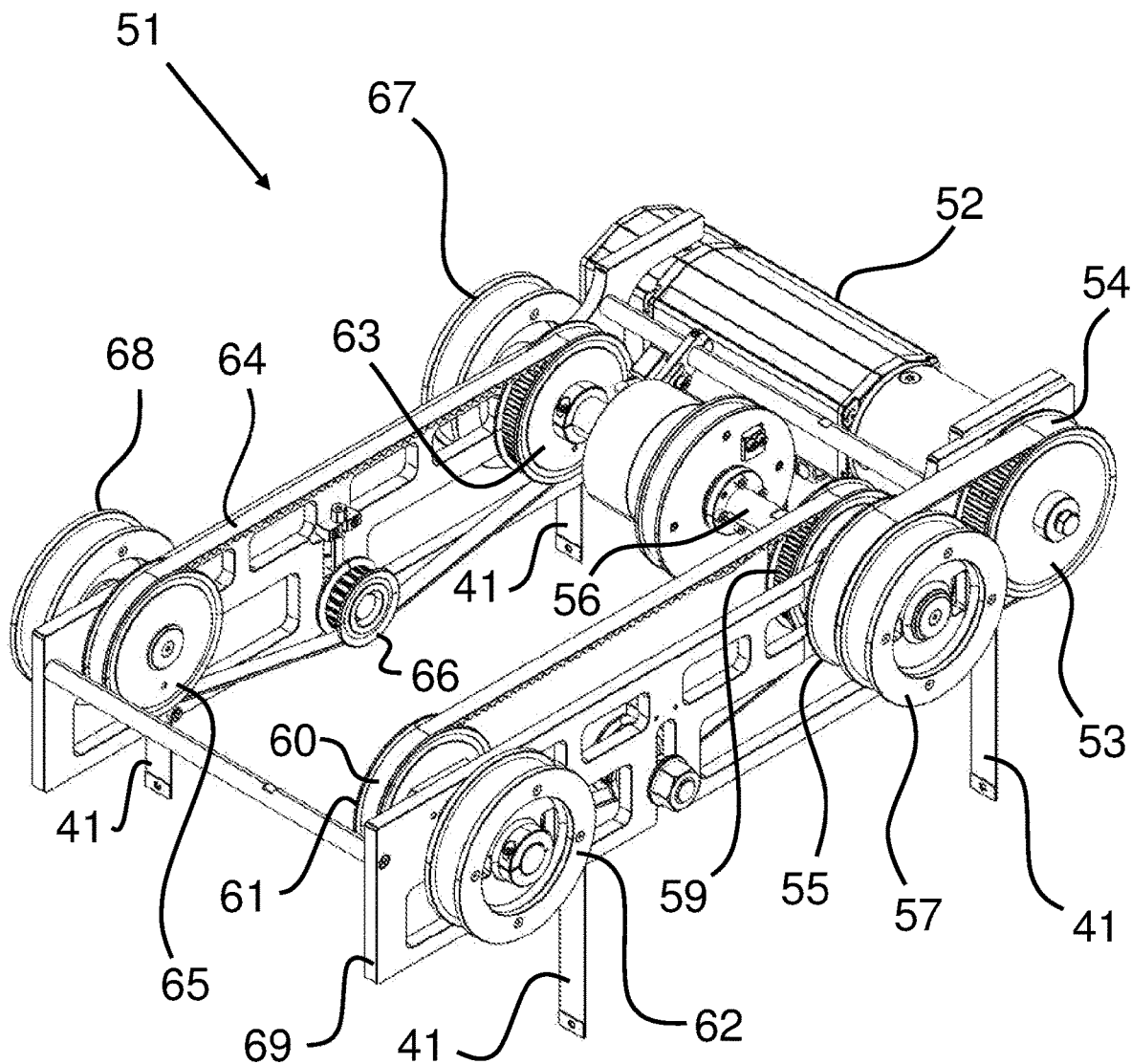
FIG. 6 schematically illustrates one example of a raising and lowering assembly for a load-handling device.

FIG. 6 shows a raising and lowering assembly 51 for a container-lifting mechanism 39 of a bot 31. The raising and lowering assembly 51 comprises a single motor 52 which is configured to rotate an output of the motor 52. The motor 52 comprises a single motor, and in the following description the terms "motor" and "single motor" are used interchangeably. The output of the motor may for example be a shaft or spindle which extends from the body of the motor 52 and is rotatable by other components of the motor 52, e.g. about a longitudinal axis of the motor 52.

A first timing pulley 53 is connected to the output of the motor 52, such that rotation of the output of the motor 52 causes rotation of the first timing pulley 53. The first timing pulley 53 may for example be fixedly mounted on the output of the motor 52.

Rotation of the first timing pulley 53 by the motor 52 causes corresponding rotation of a first timing belt 54 which is tensioned around the first timing pulley 53 and a second timing pulley 55. The rotation of the first timing belt 54 in turn causes rotation of the second timing pulley 55 on a shaft 56 on which the second timing pulley 55 is mounted. The shaft 56 rotates with the second timing pulley 55.

A first spool 57 of tape 41 is also mounted on the shaft 56. The first spool 57 rotates with the shaft 56, causing tape 41 to be unwound from or wound onto the first spool 57, depending on the direction of rotation of the shaft 56 and spool 57, thus raising or lowering the distal end of the tape 41.

As shown in FIG. 6, the distal end of the tape 41 includes means for connecting the tape 41 to a container-gripping assembly (such as the container-gripping assembly 43 illustrated in FIG. 4 and FIG. 5). The illustrated means comprises a tab on the end of the tape 41, the tab including a hole into which can be inserted a corresponding feature of the container-gripping assembly. In other examples, the tape 41 may include other or different means for connecting the tape 41 to the container-gripping assembly, such as one or more holes, hooks or other fastening features which can engage with corresponding fastening features on the container-gripping assembly. Alternatively, the distal ends of the tape 41 may be configured to connect directly to a container 9 (i.e. without an intervening container-gripping assembly), or to a further component which connects (via a container-gripping assembly or otherwise) to a container 9. In such an example, the features at the ends of the tapes 41 may be regarded as the container-gripping assembly.

A third timing pulley 59 is also mounted on the shaft 56. The third timing pulley 59 rotates with the shaft 56, causing rotation of a second timing belt 60 which is tensioned around the third timing pulley 59 and a fourth timing pulley 61. The fourth timing pulley 61 is mounted on a shaft which rotates with the fourth timing pulley 61 and also causes rotation of a second spool 62 of tape 41 which is mounted on the same shaft as the fourth timing pulley 61.

Analogously, a fifth timing pulley 63 and a third spool 67 of tape 41 are mounted on and rotate with the shaft 56, at the opposite end of the shaft 56 from the second timing pulley 55, the first spool 57 of tape 41 and the third timing pulley 59. As the fifth timing pulley 63 rotates with the shaft 56, it causes rotation of a third timing belt 64 which is tensioned around the fifth timing pulley 63 and a sixth timing pulley 65. The sixth timing pulley 65 is mounted on a shaft which rotates with the sixth timing pulley 65 and also causes rotation of a fourth spool 68 of tape 41 which is also mounted on the same shaft as the sixth timing pulley 65.

In the illustrated embodiment, the second, third and fourth spools 62, 67, 68 are substantially the same as the first spool 57 and operate in substantially the same way to wind or unwind tape 41 from the spools 62, 67, 68 as they rotate, depending on the direction of rotation.

In the illustrated embodiment, the timing pulleys 53, 55, 59, 61, 63, 65 are substantially the same as one another. The timing pulleys 53, 55, 59, 61, 63, 65 and their respective timing belts 54, 60, 64 engage via teeth and corresponding grooves or recesses. In other embodiments, the timing pulleys may be sized differently from another, e.g. to provide speed differentiation or other features, if desired. Similarly, the timing pulleys and their respective timing belts may be provided with different features to engage with each other, depending on requirements. The timing belts may also be replaced with other connectors, e.g. timing chains, depending on requirements.

In the illustrated embodiment, tensioners are provided to help maintain and/or adjust the tension in the timing belts 60, 64 (see, for example, tensioner 66). Further tensioners may be provided where desired, e.g. to help maintain or adjust the tension in timing belt 54. The illustrated tensioners are provided below the axes of rotation of the pulleys 59, 61, 63, 65. In other examples, the tensioners may be located above the axes, e.g. if it is desired to have more space available beneath the raising and lowering assembly 51, i.e. for the tensioners not to impinge on the underneath space.

The components of the raising and lowering assembly 51 are supported on a frame structure 69 of the raising and lowering assembly 51. The frame structure 69 includes appropriate holes, grooves, slots, cross members and other features to allow the various components to be mounted directly or indirectly on the frame structure 69, and to provide a relatively rigid overall structure for the raising and lowering assembly 51.

The frame structure 69 may be configured such that it can be releasably engaged with a body 33 of a bot 31. It may for example be arranged to be slid into and out of the body 33 of a bot 31 and held in place relative to the body 33 with appropriate fixing means, such as nuts and bolts which engage with corresponding holes, grooves or slots in the frame structure 69 and the body 33 of the bot 31 (or one or more components mounted on the body 33 of the bot 31). Configuring the raising and lowering assembly 51 for releasable engagement with the body 33 may advantageously mean that the raising and lowering assembly 51 can be easily removed and replaced with another assembly 51 (e.g. if the first assembly 51 needs to be serviced or repaired), allowing the corresponding bot 31 to return to service relatively quickly.

The illustrated arrangement allows a single motor 52 to cause raising and lowering of tapes 41 from all four spools 57, 62, 67, 68. The illustrated arrangement has various advantages, including that: cost and space within the body 33 of the bot 31 may be saved relative to arrangements incorporating more motors; the rates of winding and unwinding of the four different spools 57, 62, 67, 68 do not need synchronising, as they are all driven by the same motor, allowing them to be wound and unwound at the same rate without additional gearing, control or other intervention; only a single brake is required to slow or stop the motor and therefore the winding or unwinding of the different spools 57, 62, 67, 68; only a single control unit is required to control the raising and lowering of the four different spools 57, 62, 67, 68, since the single control unit can control the single motor to achieve this raising and lowering control; a large open aperture is defined within the frame structure 69 (i.e. between the third, fourth, fifth and sixth timing pulleys 59, 61, 63, 65), allowing other components to be accommodated within the body 33 of the bot 31 and/or allowing components to be more easily inserted into and removed from the body 33 of the bot 31 when the raising and lowering assembly 51 is in situ. This may particularly advantageously allow components within the body 33 of the bot 31 to be swapped more frequently; for instance, it may allow a rechargeable battery of the bot 31 to be easily removed from the body 33 of the bot 31 and replaced with another rechargeable battery. The fact that the illustrated single motor 52 is mounted outboard of the shaft 56 (i.e. outboard of all rotational axes of the spools 57, 62, 67, 68 of tape 41) may help to provide one or more of these advantages, in particular the advantages related to defining a large open aperture within the frame structure 69. The outboard mounting of the single motor 52 may furthermore help to balance the centre of mass of the bot 31, e.g. counterbalancing the mass of the frame structure 69 and the other components of the raising and lowering assembly 51.

A single motor configured to control the raising and lowering of multiple spools 57, 62, 67, 68 may furthermore allow the use of an advantageous gearing arrangement. Using the single motor with such a gearing arrangement may advantageously help to better match the motor inertia and the load inertia of the container 9 to be lifted. For example, using a single motor may allow more space for an advantageous gearing mechanism than using multiple motors and multiple corresponding gearing arrangements would, in particular do the relative sizes of the gearing arrangements in the illustrated single-motor configuration and a multi-motor configuration. In the illustrated example, the output of the single motor 52 is connected to the first timing pulley 53 via a gearing mechanism.

A single motor with an advantageous gearing arrangement may also allow more precise control of the raising and lowering of the load, for example by allowing a larger ratio between numbers of motor rotations and corresponding linear movement of the distal ends of the tapes 41, effecting finer control of the distances travelled by containers 9 or other loads lifted using the raising and lowering assembly 51. This may help minimise damage to the containers 9, the body 33 of the bot 31 and/or other objects in the vicinity of the bot 31 by ensuring a container 9 is not raised or lowered too far. It may also allow a better dynamic servo system due to gearbox advantage in regard to position and inertia. It may reduce the number of sensors and encoders required to control the winding and unwinding of the spools 57, 62, 67, 68 with the single motor, since only one motor's rotation needs to be monitored and controlled, and may eliminate the need for hard stops.

Advantageously, the illustrated raising and lowering assembly 51 with a single motor to control the winding and unwinding of four different spools 57, 62, 67, 68 may also minimise the number and/or volume of electrical cables that are required to connect a control unit and the raising and lowering assembly 51, since a different cable does not need to be directed to each of multiple motors. This may additionally make inserting and removing the raising and lowering assembly 51, and/or removing other components of the bot 31 through or around the raising and lowering assembly 51, easier, since one need only disconnect a single cable (or single set of cables) to disconnect the raising and lowering assembly 51 from the control unit.

In the illustrated embodiment, a communications cable reel is also mounted on the shaft 56, between the third timing pulley 59 and the fifth timing pulley 63. The communication cable transmits control instructions from a control unit to the gripping means at the ends of the tapes 41. Advantageously, in the illustrated embodiment, the communications cable is also raised and lowered by the action of the single motor 52, as the communications cable reel is mounted on and rotates with the shaft 56. This means that the distal end of the communications cable is raised and lowered at the same rate as the ends of the tapes 41, and so no further synchronisation is required to ensure that the communication cable is lowered and retracted with the container-gripping assembly 43. The outboard mounting of the single motor 52 may enable this mounting of the communications cable reel on the shaft 56.

Before the single motor 52 raises or lowers the container-gripping assembly 43 and any engaged container 9, the wheel-positioning mechanism preferably ensures that the first set of wheels 35 and the second set of wheels 37 of the bot 31 are both engaged with respective tracks 17, 19 in the first and second sets of tracks 17, 19. This may advantageously provide additional stability as the container-gripping assembly 43 is raised and lowered, and may additionally help to ensure that any malfunction in or more of the wheels 35, 37 which would cause the bot 31 to move along the tracks 17, 19 is counteracted by the other set of wheels being in contact with the tracks. This may advantageously avoid damage to the storage structure 1 if the bot 31 attempts to move while the container-gripping assembly 43 is in a lowered configuration.

Although in the illustrated embodiment rotation is transferred between various entities using timing belts 54, 60, 64, in other embodiments, one or more gears may be used in place of one or more of the timing belts. In such cases, the number of gears may be chosen to ensure that the direction of rotation is transferred appropriately. Alternatively, the output of the motor 52 may be reversed to accommodate the presence of, for example, an odd number of gears between timing pulleys 53, 55. For ease of explanation of the particular embodiment of the present invention with reference to FIG. 6, spool 57 is defined by a first spool 57, spool 62 is defined by a second spool 62, spool 67 is defined by a third spool 67 and spool 68 is defined by a fourth spool 68. The first spool 57 and the third spool 67 are mounted on the shaft 56. The second spool 62 and the fourth spool 68 are mounted on separate shafts. The first spool 57 and the third spool 67 provides a first set of spools 57, 67 and the second spool 62 and the fourth spool 68 provides a second set of spools 62, 68. In the particular embodiment of the present invention shown in FIG. 6, each of the first and second set of spools is mounted on separate shafts driven by the single motor 52 to raise and lower the container-gripping assembly 43 via the plurality of timing pulleys and/or timing belts (54, 60, 64) and/or gears.

For ease of explanation of the particular embodiment of the present invention with reference to FIG. 6, timing pulley 53 is defined by a first timing pulley 53, timing pulley 55 is defined by a second timing pulley 55, timing pulley 59 is defined by a third timing pulley 59, timing pulley 61 is defined by a fourth timing pulley 61, timing pulley 63 is defined by a fifth timing pulley 63 and timing pulley 65 is defined by a sixth timing pulley 65. The third timing pulley 59 and the fifth timing pulley 63 are mounted on the shaft 56. The third timing pulley 59 and the fifth timing pulley 63 provides a first set of timing pulleys 59, 63. The fourth timing pulley 61 and the sixth timing pulley 65 are mounted on separate shafts. The fourth timing pulley 61 and the sixth timing pulley 65 provides a second set of timing pulleys 61, 65. The first timing pulley 53 is mounted to the output of the single motor 52, e.g. on a drive rotor. The second timing pulley 55 provides a drive pulley. The second timing pulley or drive pulley 55 is mounted on the shaft 56 mounting the first set of timing pulleys 59, 63 and connected to the first timing pulley 53 mounted on the drive rotor by a timing belt/chain 54 such that rotation of the first timing pulley 53 driven by the single motor 52 drives the rotation of the second timing pulley or drive pulley 55 mounted on the shaft and thus, rotation of the first set of timing pulleys 59, 63 mounted on the shaft 56. This in turn causes rotation of the first set of spools 57, 67 mounted on the shaft 56.

Figure 6A:
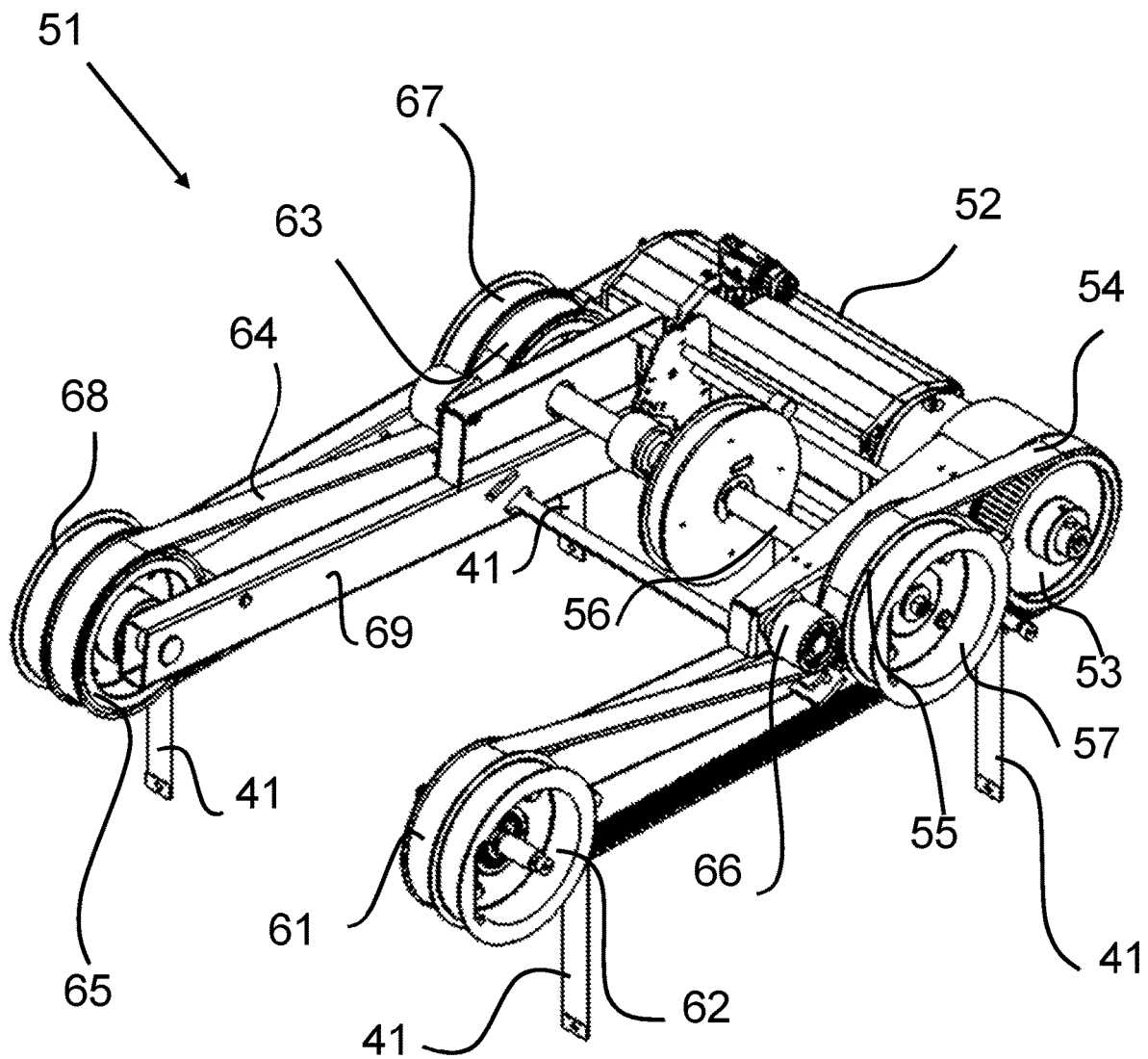
FIG. 6a schematically illustrates a second example of a raising and lowering assembly for a load-handling device.

FIG. 6*a* shows a second example of a raising and lowering assembly 51 for a container-lifting mechanism 39 of a bot 31. The raising and lowering assembly 51 comprises a single motor 52 which is configured to rotate an output of the motor 52. The motor 52 comprises a single motor, and in the following description the terms "motor" and "single motor" are used interchangeably. The output of the motor may for example be a rotor shaft or spindle which extends from the body of the motor 52 and is rotatable by other components of the motor 52, e.g. about a longitudinal axis of the motor 52.

In this description of FIG. 6*a*, the same reference numbers will be used as for the description of FIG. 6 above. Since the specific embodiments of FIG. 6 and FIG. 6*a* comprise different numbers of timing pulleys and timing belts, the timing pulleys and timing belts will be referred to by reference numbers rather than by ordinal numbers (first, second, third etc.). In FIG. 6*a*, the timing pulley 55 is the drive pulley, which is also one of the first set of timing pulleys. As in FIG. 6, the first set of pulleys 55, 63 are mounted on the shaft 54, and the second set of timing pulleys 61, 65 are mounted on separate shafts.

The timing pulley 53 is connected to the output of the motor 52, such that rotation of the output of the motor 52 causes rotation of the timing pulley 53. The timing pulley 53 may for example be fixedly mounted on the output of the motor 52, e.g. rotor shaft.

Rotation of the timing pulley 53 by the motor 52 causes corresponding rotation of a timing belt 54 which is tensioned around three timing pulleys: timing pulley 53, the drive pulley 55, and timing pulley 61 (one of the second set of timing pulleys). The rotation of the timing belt 54 in turn causes rotation of the drive pulley 55 on the shaft 56 on which the drive pulley 55 is mounted. The shaft 56 rotates with the drive pulley 55. The timing pulley 61, which is one of the second set of timing pulleys, is mounted on a separate shaft which rotates with the timing pulley 61.

The first spool 57 of tape 41 is also mounted on the shaft 56. The first spool 57 rotates with the shaft 56, causing tape 41 to be unwound from or wound onto the first spool 57, depending on the direction of rotation of the shaft 56 and spool 57, thus raising or lowering the distal end of the tape 41. The distal end of the tape 41 is anchored to the container gripper assembly. The timing pulley 61 (which is one of the second set of timing pulleys), causes rotation of the second spool 62 of tape 41 which is mounted on the same shaft as the third timing pulley 61.

Analogously, the timing pulley 63 (which is one of the first set of timing pulleys) and the third spool 67 of tape 41 are mounted on and rotate with the shaft 56, at the opposite end of the shaft 56 from the drive pulley 55 and the first spool 57 of tape 41. As the timing pulley 63 rotates with the shaft 56, it causes rotation of the timing belt 64 which is tensioned around the timing pulley 63 and the timing pulley 65. The timing pulley 65 (which is one of the second set of timing pulleys) is mounted on a separate shaft which rotates with the timing pulley 65 and also causes rotation of a fourth spool 68 of tape 41 which is also mounted on the same shaft as the timing pulley 65. Thus, the connection of the timing pulley 53 with the drive pulley 55 and the third timing pulley 61 by the timing belt/chain 54 and the connection of the timing pulley 63 to the timing pulley 65 by the timing belt/chain 64 provides synchronized rotational movements of the first and second sets of spools, 57, 62, 67, 68 as the single motor is driven.

In the illustrated embodiment, tensioners are provided to help maintain and/or adjust the tension in the timing belts 54, 64 (see, for example, tensioner 66). The illustrated tensioners are provided above the axes of rotation of the first set of timing pulleys 55, 63 and the second set of timing pulleys 61, 65 with the timing belts 54, 64 passing below the tensioners. Taking the tensioner 66 as an example, the positioning of the tensioner 66 has the advantage of increasing the contact area between the timing belt 54 and the drive pulley 55. Unlike the embodiment of FIG. 6, the timing belt 54 is tensioned around three pulleys 53, 55, 61. Without the presence of a tensioner, the contact area between the central drive pulley 55 and the timing belt 64 would be small, increasing the risk of the timing belt 64 slipping.

In a similar arrangement to the embodiment described above with reference to FIG. 6, the first set of spools comprising the first and third spools 57, 67 is mounted on the shaft 56. The second set of spools comprising the second and fourth spools 62, 68 are shown mounted on separate shafts. Each of the first and second set of spools mounted on separate shafts are driven by the single motor to raise and lower the container gripper assembly via the plurality of timing pulleys and/or timing belts (54, 60, 64) and/or gears.

In the embodiment of FIG. 6*a*, the use of a single timing belt 54 around three timing pulleys 53, 55, 61 to drive the rotation of two spools 57 and 62, as opposed to the embodiment of FIG. 6 where two timing belts 54, 60 are used for the same purpose, has the advantage of a smaller part count. This reduces the cost, weight, and complexity of the raising and lowering assembly 51. The drive pulley 55 in the embodiment of FIG. 6*a* is a single timing pulley that fulfils the function of two timing pulleys (the drive pulley 55 and the third timing pulley 59) of the embodiment of FIG. 6. Compared to the embodiment of FIG. 6, in the embodiment of FIG. 6*a* one timing belt and one timing pulley is therefore eliminated.

The components of the raising and lowering assembly 51 are supported on a frame structure 69 of the raising and lowering assembly 51. In the embodiment of FIG. 6*a*, the two timing belts 54, 64 are positioned on the outside of the frame structure 69. The elimination of the timing pulley 59 enables the timing belts to be positioned on the outside of the frame structure because the reduction in number of parts is advantageous for packaging. An advantage of positioning the timing belts 54, 64 on the outside of the frame structure 69 is that the timing belts 54, 64 are more easily accessible for maintenance (e.g. adjusting the tensioners) or replacement.

The four spools 57, 62, 67, 68 may be connected to their respective timing pulleys 55, 61, 63, 65, such that the timing belts 54, 64 cause the timing pulleys and the spools to rotate together or in synchronization. Each spool may be bolted to its respective timing pulley, or attached by some other means. The connection is described here with respect to the first spool 57 and the drive pulley 55, but it will be appreciated that the connections between each of the four spools 57, 62, 67, 68 and their respective timing pulleys 55, 61, 63, 65 may be substantially the same.

Figure 6B:
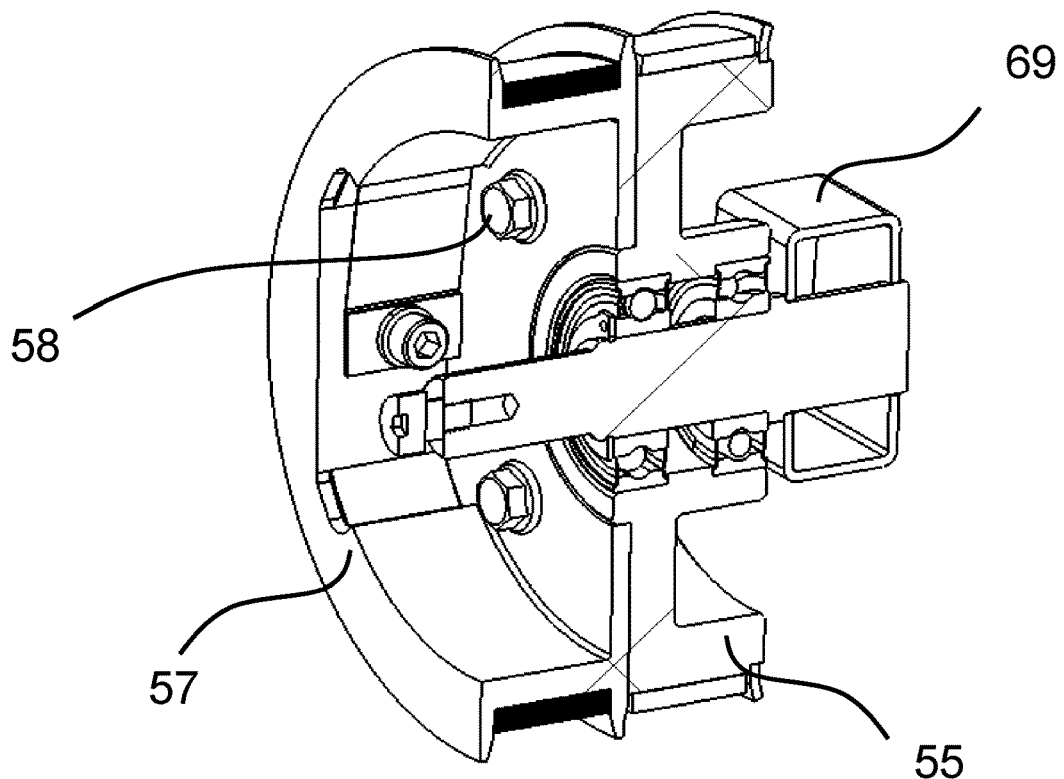
Figure 6C:
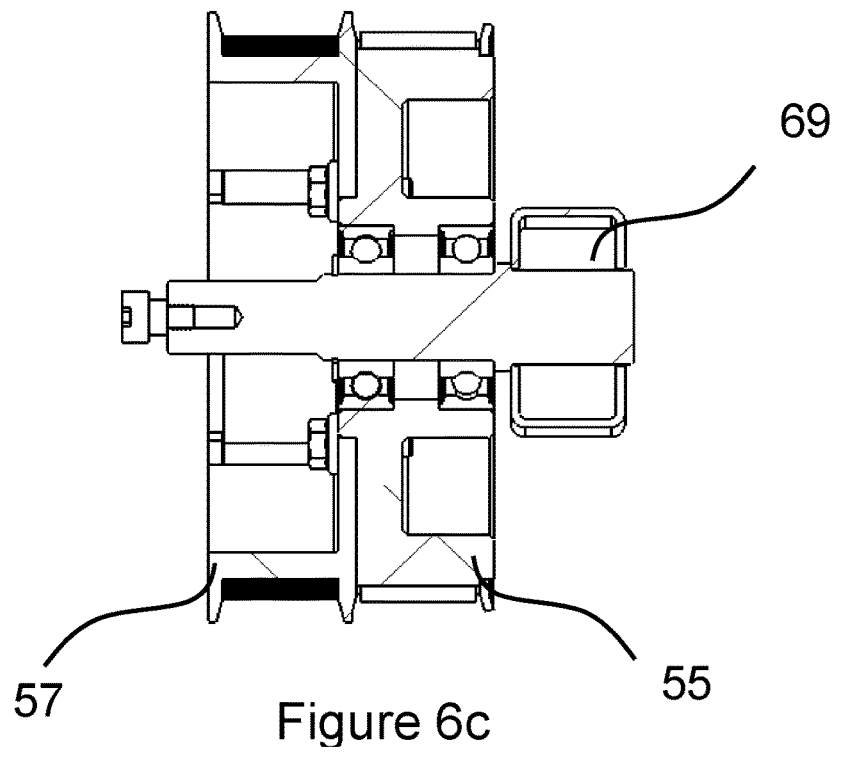
FIG. 6c is a different view of the example of FIG. 6c.

FIGS. 6*b* and 6*c* illustrate two views of the spool 57 bolted to the timing pulley 55. The spool 57 is connected to the timing pulley 55 with one or more bolts 58. The bolts 58 provide for an adjustable connection between the spool 57 and the timing pulley 55. Bolts are one example of an adjustment mechanism between the spool 57 and the timing pulley 55, but it will be appreciated that others forms of adjustment mechanisms are known to the person skilled in the art.

The spool 57 may be provided with one or more slots, through which the bolts 58 may pass. The slots permit angular adjustment between the spool 57 and the timing pulley 55. It is necessary for the container gripper assembly to remain horizontal in use, so the ability to fine-tune the angular positions of the spools is desirable. Adjusting the angular position of the spools may be necessary if, for example, one of the tapes 41 becomes stretched or kinked, so that the lengths of the tapes 41 are no longer equal.

Connecting the spool 57 to the timing pulley 55 via an adjustment mechanism has the additional advantage that the adjustment mechanism replaces a portion of the tolerance stack-up which determines the angular position of the spools. A smaller tolerance stack-up means that the tolerances on the parts in the raising and lowering assembly 51 may be less precise, which saves cost on manufacturing processes. For example, the parts may be manufactured by welded fabrication rather than by precise machining of the parts.

Alternatively, the spool 57 and the timing pulley 55 may be manufactured as an integral component. This has the advantage of further reducing the part count and complexity of the raising and lowering assembly 51.

The timing pulley 55 and the spool 57 are mounted to the frame structure 69 of the raising and lowering assembly 51.

Figure 7:
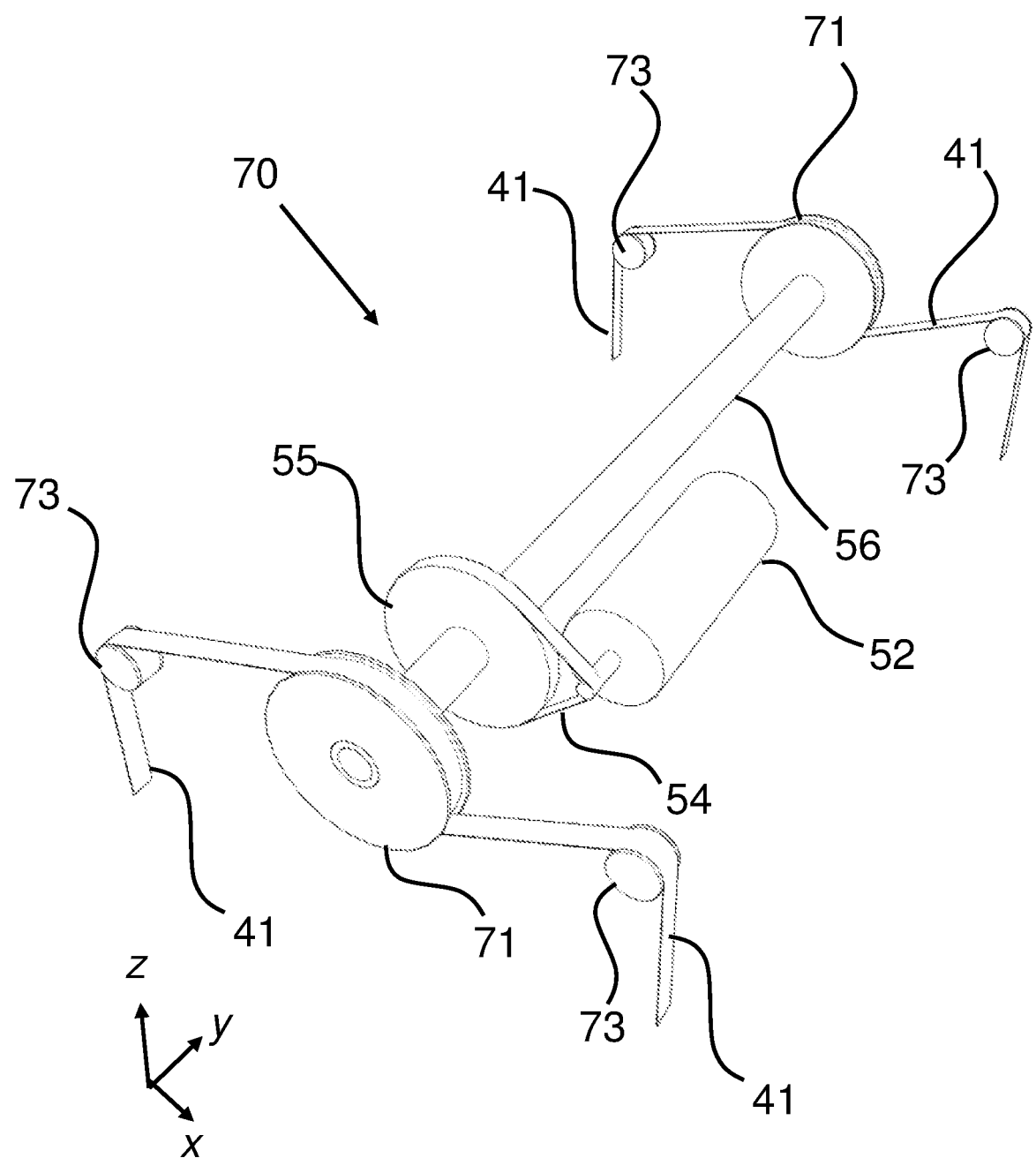
FIG. 7 schematically illustrates another example of a raising and lowering assembly for a load-handling device.
Figure 8:
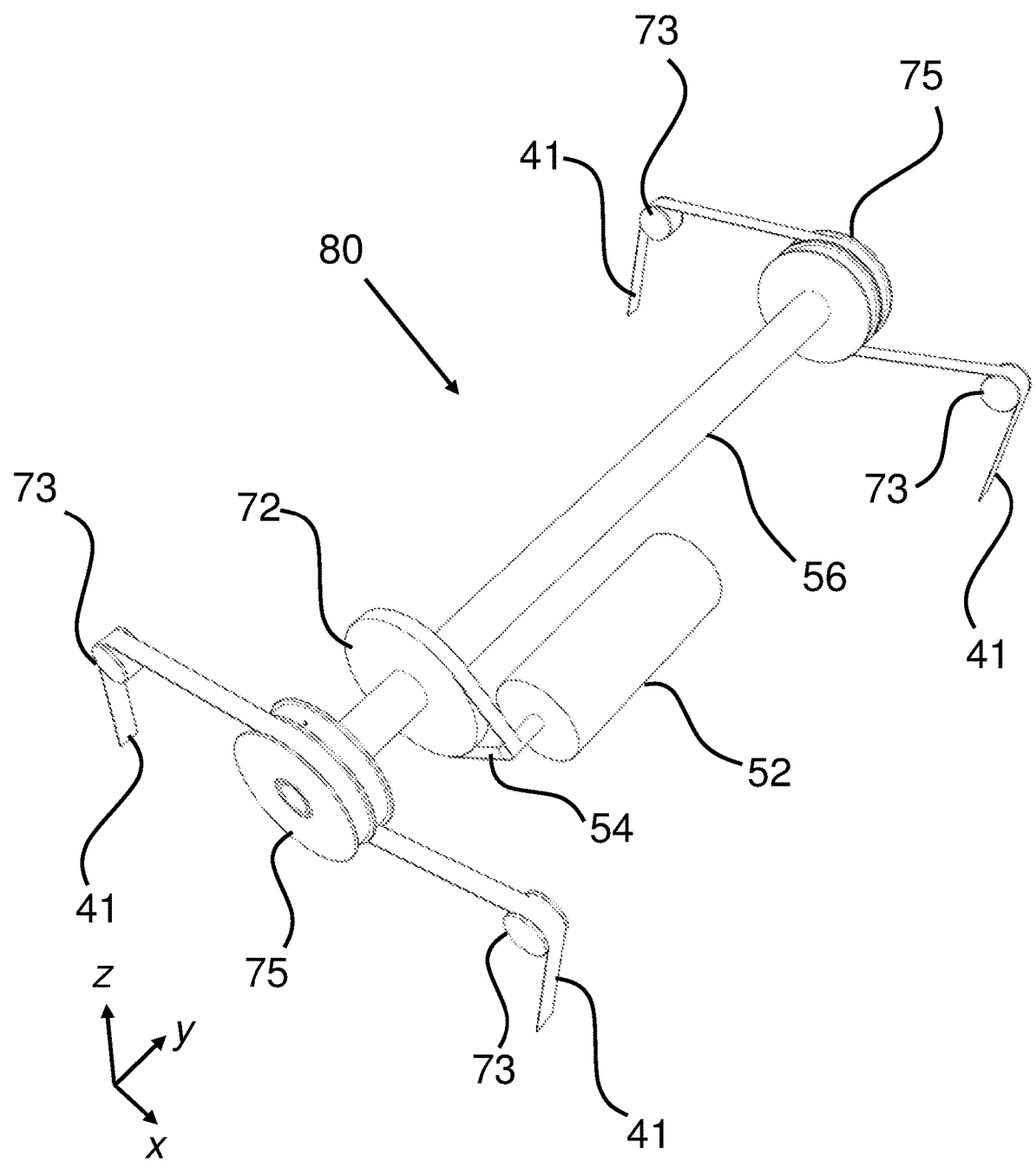
FIG. 8 schematically illustrates a further example of a raising and lowering assembly for a load-handling device.

FIG. 7 and FIG. 8 show representations of alternative raising and lowering assemblies (also referred to as lifting assemblies) 70, 80 for a load-handling device 31, for raising and lowering a container 9. The lifting assemblies 70, 80 each comprise a motor 52 whose output is connected via a timing belt 54 to a timing pulley or gear 55, 72.

Extending through the gear 55 a common shaft or axle 56 extends to first and second tape spools or hoist drums 71, 75, around which lifting tape 41 is wound. A first end of the lifting tape 41 is attached to the hoist drums 71, 75. The second, distal end of the tape 41 may be connected to a container-gripping assembly 43 (also referred to as a gripper plate) as previously described, or may otherwise support a container-gripping assembly to enable the container-gripping assembly to be raised and lowered. Slave wheels 73 are used to guide the lifting tape 41 to the gripper plate attached to the ends of the lifting tape 41 and/or to adjust the tension in the lifting tape 41, like the tensioner 66 described above in the context of FIG. 6. The gripper plate is used to latch to a load, which may then be lifted and lowered by the lifting assembly 70, 80.

In the case of the assembly 70 shown in FIG. 7, two lifting tapes 41 are wound alternately around each of the two drums 71. Thus, when the first and second drums 71 are rotated by the motor 52 to lower the gripper plate, all four tapes 41 unwind at the same time and at the same speed. In reverse, the lifting tapes 41 wrap or coil around the hoist drums 71 at the same time and speed, thereby lifting a weight or payload supported by the gripper plate.

In the case of the assembly 80 shown in FIG. 8, first and second ends of lifting tapes 41 are wound around twin drums 75 at each end of the axle or shaft 56.

For both assemblies 70, 80, at each end of the axle 56, the tapes 41 unwind from the top and bottom of the drum 71, 75 respectively to balance the forces applied to the assembly. For both assemblies 70, 80 the drums 71, 75 are in the z,x-plane. Alternatively, the drums 71, 75 may be arranged in the z,y-plane.

It will be appreciated that the diameter of the drums 71 is necessarily larger than that of the respective drums 75 for a given length of lifting tape 41. Correspondingly, the gear 55 is larger than the gear 72, and the required torque produced by motor 52 of FIG. 7 is larger than the required torque produced by motor 52 of FIG. 8.

The lifting assembly 70 has the advantage that fewer parts are required. The lifting assembly 80 has the advantage that the drums 75, gear 72 and motor 52 in FIG. 8 are able to be made smaller. In both cases, the space required within the body of the load-handling device 31 by the lifting assembly 70, 80 may be minimised.

It will be appreciated that where four tapes are used a gripper plate may be attached to the distal ends of the lifting tapes 41. It will be appreciated that in other embodiments an alternative arrangement may be used. For example, in some embodiments, a sling arrangement may be provided, in which only two tapes 41 are used, the tapes 41 being passed between pulleys which are mounted on the gripper plate (e.g. in a similar way to the arrangement of pulleys shown in FIG. 12), the gripper plate being supported by the sling of tape 41 passing through the pulleys. The gripper plate will have one or more gripper assemblies mounted thereon for latching to a storage container 9.

One or more of the components illustrated in FIG. 7 and FIG. 8 may be mounted on a frame such as frame 69 illustrated in FIG. 6. This may advantageously allow the alternative lifting assemblies 70, 80 to be removably mounted inside the body of a load-handling device 31 and easily swapped for a replacement lifting assembly in the event of a failure.

Figure 9:
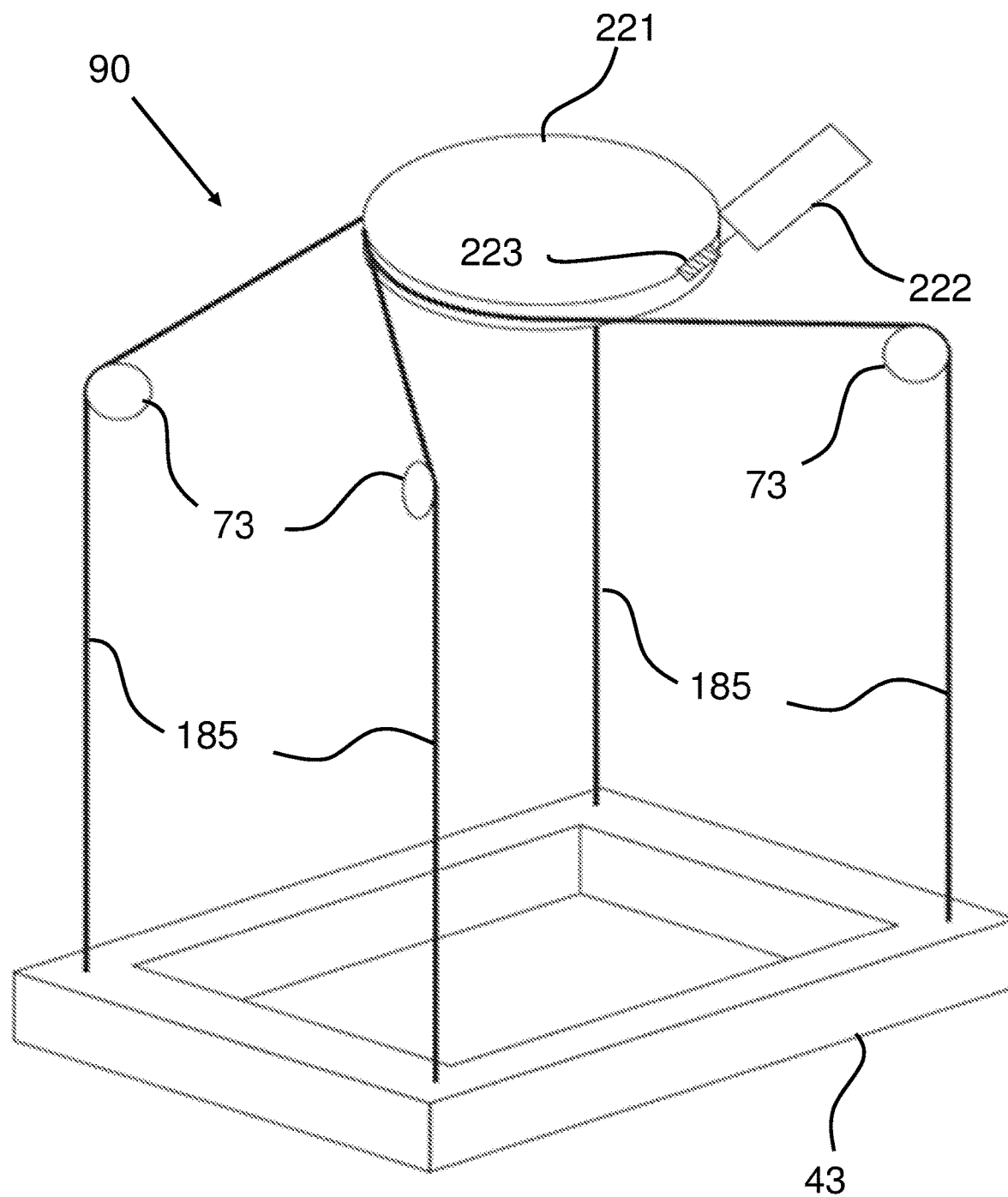
FIG. 9 schematically illustrates a different example of a raising and lowering assembly for a load-handling device.
Figure 10:
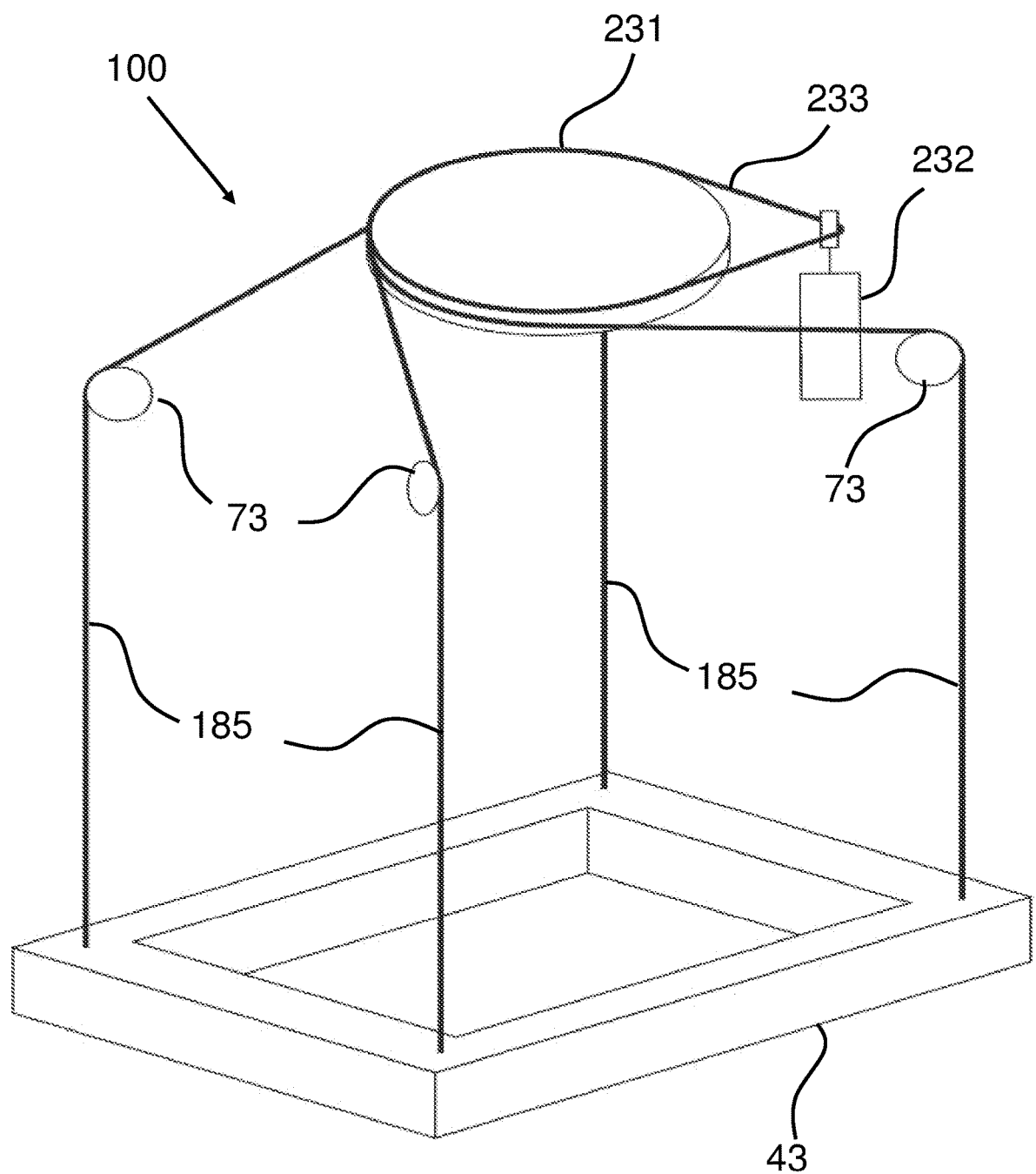
FIG. 10 schematically illustrates an additional example of a raising and lowering assembly for a load-handling device.

FIG. 9 and FIG. 10 illustrate alternative drum arrangements for lifting assemblies 90, 100. For both assemblies 90, 100 the hoist drum 221, 231 is in the x,y-plane. This arrangement has the advantage that the drum can be much larger without occupying much more space within the body of a load-handling device 31. Instead, the drum 221, 231 is substantially in plane with the upper face or surface of the load-handling device. The diameter of the drum 221, 231 may be substantially up to the length of the shorter x- or y-side of the load-handling device.

Advantageously the drum 221, 231 is wound with a much smaller motor 222, 232. The drive shaft of the motor 222 has a worm gear 223 which directly drives the drum 221. This allows the motor 222 to be arranged in the same plane as the drum 221, and enables a large step-down ratio without the need for additional gear wheels. The drive shaft of the motor 232 is coupled to the drum 231 with a simple direct drive pulley arrangement 233. The motor 232 is arranged vertically (pointing in the z-direction, perpendicular to the plane of the drum 231).

In the arrangements of FIG. 9 and FIG. 10, four lifting tapes 41 are spooled around the same drum 221, 231. The four lifting tapes 41 are directed to the four corners of a gripper plate 43. As a result, each corner of the gripper plate 43 is lifted and lowered in unison when the drum 221, 231 is operated and the four tapes 41 are spooled or unspooled simultaneously.

Figure 11:
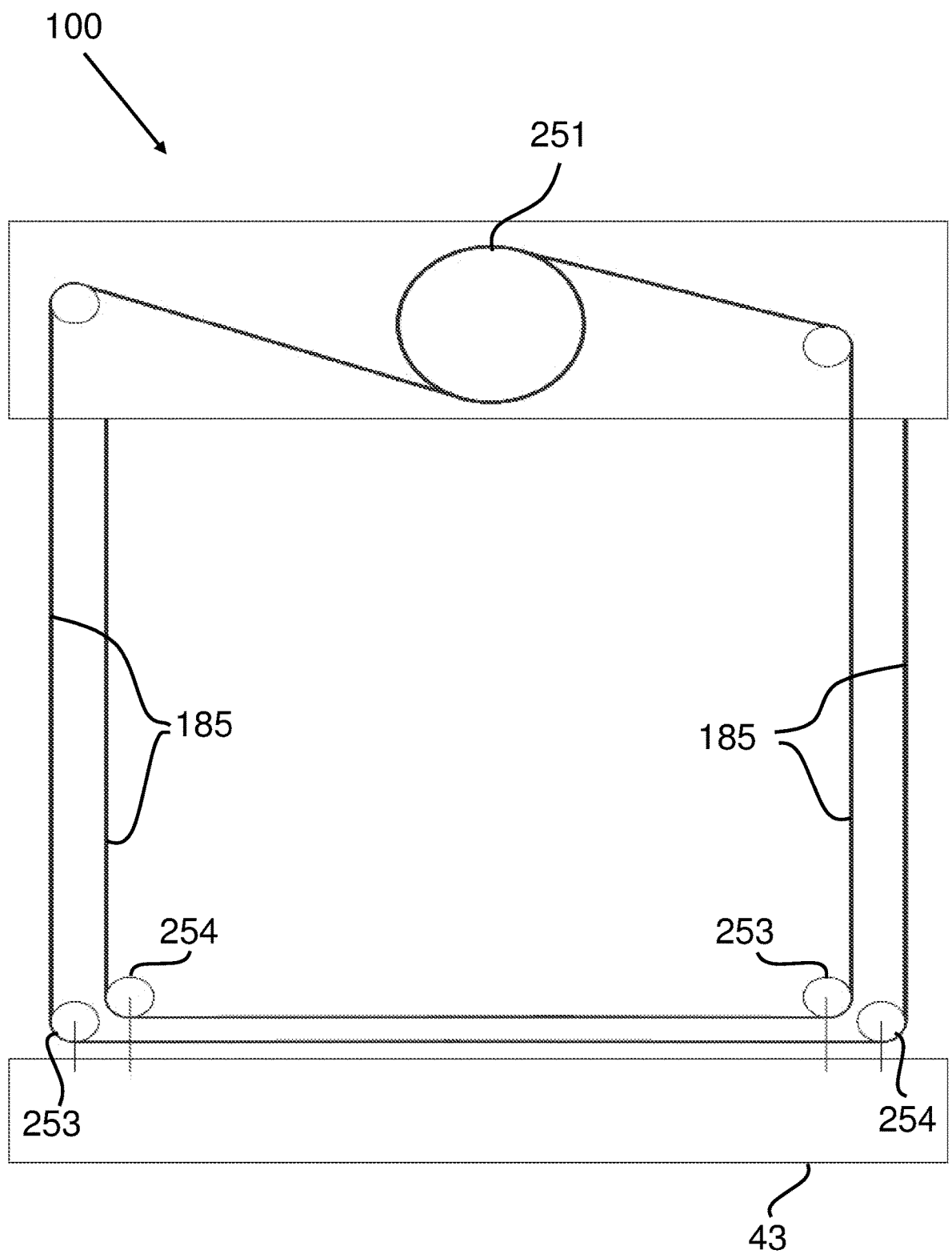
FIG. 11 schematically illustrates a supplementary example of a raising and lowering assembly for a load-handling device.
Figure 12:
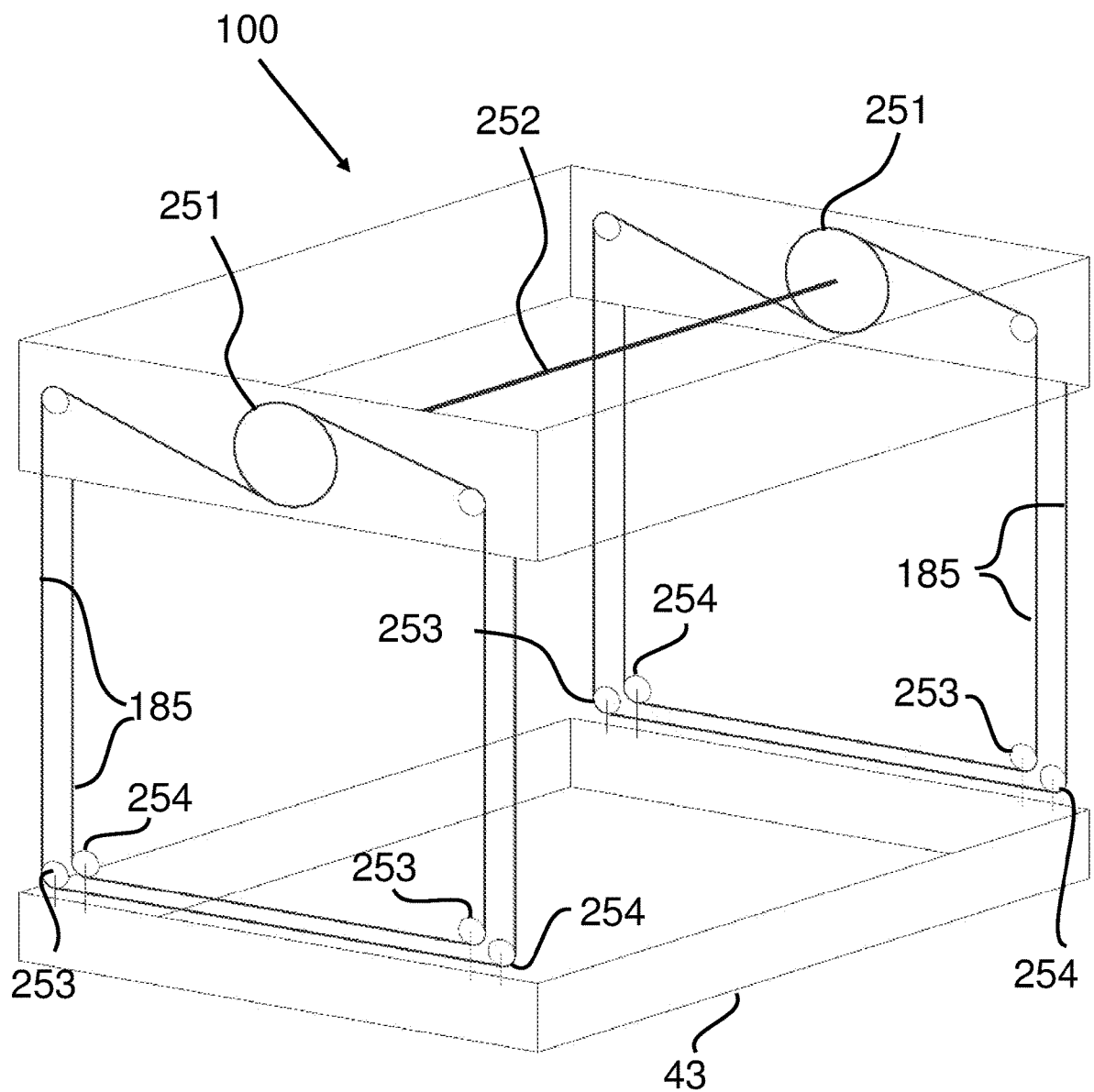
FIG. 12 schematically illustrates the example raising and lowering assembly of FIG. 11.

FIG. 11 and FIG. 12 illustrate a further example of a lifting assembly 100. A single z,x- or z,y-plane of the lifting assembly 100 is shown in FIG. 11, while FIG. 12 shows a perspective view illustrating two z,x- or z,y-planes of the lifting assembly 100. The arrangement of the lifting mechanism is similar to the arrangement of the lifting assembly described above in connection with FIG. 7 and FIG. 8, where hoist drums 71, 75 share a common axle 56. A first pair of tapes 185 are spooled on a first hoist drum 251, and a second pair of tapes 185 are spooled on a second hoist drum 251. The two pairs of tapes 185 are directed to support each corner of a gripper plate 43. Further, the tapes 185 of lifting assembly 100 comprise a pulley system sling arrangement.

Considering the pair of tapes 185 of a single hoist drum 251, first ends of the tapes 185 are fixed to the respective drum 251. The tapes 185 extend to opposed corners of the upper portion of the lifting assembly 100, where they are directed by guide wheels towards the gripper plate 43. First pulleys 253 mounted on the gripper plate 43 direct the tapes 185 along the gripper plate 43 to second pulleys 254 mounted on the gripper plate 43. From the second pulleys 254, the tapes 185 return to the upper portion of the lifting assembly 100, to which the second ends of the tapes 185 are fixed. Thus, the pair of tapes 185 form a nested pair of sling arrangements.

It will be appreciated that the lifting assembly 100 has the advantages of the other single-motor arrangements described and illustrated, since the single shaft 252 connecting the two drums 251 can be driven by a single motor. The lifting assembly 100 further has the advantages of a sling arrangement, and the advantages of pulley arrangements. For instance, as illustrated, just one end of the sling may be spooled or unspooled, allowing the lifting assembly to operate with only one hoist drum operational (as opposed to other lifting arrangements in which multiple spools are wound and unwound separately by separate motors, and/or to other lifting arrangements in which multiple spools are wound and unwound by a common motor, e.g. as illustrated in FIG. 6). Furthermore, pulley arrangements may, depending on specific configuration, advantageously reduce the force required to lift and lower the load. This may advantageously have as a consequence that thinner tapes or wires may be used to lift a load that would otherwise require a much stronger tape. Pulley arrangements may furthermore allow finer control of raising and lowering, due to the effective gearing provided by having lifting tape passing back on itself.

Although in the embodiment illustrated in FIG. 11 and FIG. 12 a pair of tapes 185 are wound and unwound onto and from each drum 251, in other embodiments only a single tape 185 may be wound and unwound from the drum 251, reducing the length of tape 185 required for raising and lowering.

In some embodiments, four tape spools, such as the spools 57, 62, 67, 68 illustrated in FIG. 6 may be mounted on and distributed along the axial length of a single shaft, such as the shaft 56 illustrated in any of FIG. 6, FIG. 7 or FIG. 8. The tapes on the four tape spools may be guided to appropriate connection points on a gripper plate 43 by slave or guide wheels or tracks, such as the slave or guide wheels 73 illustrated in FIG. 7 and FIG. 8. This may advantageously reduce the number and/or mass of components forming part of the lifting assembly by reducing the number of mounting points for components of the lifting assembly.

One or more components of any of the lifting assemblies described and illustrated may be mounted directly or indirectly on a frame that can be releasably mounted on a load-handling device. Thus, the lifting assembly is used to lift containers into the cavity of the load-handling device. It will be appreciated that the lifting assembly used in reverse is used to lower containers from the load-handling device to a position in a stack below the grid.

Although in many of the foregoing embodiments lifting tapes were described, other lifting connectors, such as ropes, strings, wires or other materials, may be used in place of tapes.

It is envisaged that any one or more of the variations described in the foregoing paragraphs may be implemented in the same embodiment of a load-handling device.

In this document, the language "movement in the n-direction" (and related wording), where n is one of x, y and z, is intended to mean movement substantially along or parallel to the n-axis, in either direction (i.e. towards the positive end of the n-axis or towards the negative end of the n-axis).

In this document, the word "connect" and its derivatives are intended to include the possibilities of direct and indirection connection. For example, "x is connected to y" is intended to include the possibility that x is directly connected to y, with no intervening components, and the possibility that x is indirectly connected to y, with one or more intervening components. Where a direct connection is intended, the words "directly connected", "direct connection" or similar will be used. Similarly, the word "support" and its derivatives are intended to include the possibilities of direct and indirect contact. For example, "x supports y" is intended to include the possibility that x directly supports and directly contacts y, with no intervening components, and the possibility that x indirectly supports y, with one or more intervening components contacting x and/or y. The word "mount" and its derivatives are intended to include the possibility of direct and indirect mounting. For example, "x is mounted on y" is intended to include the possibility that x is directly mounted on y, with no intervening components, and the possibility that x is indirectly mounted on y, with one or more intervening components.

In this document, the word "comprise" and its derivatives are intended to have an inclusive rather than an exclusive meaning. For example, "x comprises y" is intended to include the possibilities that x includes one and only one y, multiple y's, or one or more y's and one or more other elements. Where an exclusive meaning is intended, the language "x is composed of y" will be used, meaning that x includes only y and nothing else.

Further features of the invention may also include the following numbered clauses:

Clause 1: A load-handling device (31) for lifting and moving containers (9) stacked in stacks (11) in a storage structure (1), the storage structure (1) including, above the stacks (11) of containers (9), a first set of tracks (17) extending in a first direction and a second set of tracks (19) extending in a second direction which is transverse to the first direction, the load-handling device (31) being configured to move on the tracks (17, 19) above the stacks (11), the load-handling device (31) comprising:

a body (33) having an upper portion (45) and a lower portion (47), the upper portion (45) being configured to house one or more operation components, the lower portion (47) being arranged beneath the upper portion (45), the lower portion (47) comprising a container-receiving space for accommodating at least part of a container (9);

a wheel assembly arranged to support the body (33), the wheel assembly comprising a first set of wheels (35) for engaging with the first set of tracks (17) to guide movement of the load-handling device (31) in the first direction and a second set of wheels (37) for engaging with the second set of tracks (19) to guide movement of the load-handling device (31) in the second direction;

a wheel-positioning mechanism for selectively engaging either the first set of wheels (35) with the first set of tracks (17) or the second set of wheels (37) with the second set of tracks (19), the wheel-positioning mechanism being configured to raise or lower the first set of wheels (35) or the second set of wheels (37) relative to the body (33), thereby enabling the load-handling device (31) to selectively move in either the first direction or the second direction across the tracks (17, 19) of the storage structure (1); and a container-lifting mechanism (39) comprising a container-gripping assembly (43) configured to releasably grip a container (9) and a raising and lowering assembly (51, 70, 80, 90, 100) configured to raise and lower the container-gripping assembly (43), wherein the raising and lowering assembly (51, 70, 80, 90, 100) comprises a single motor (52, 222, 232) configured to raise and lower the container-gripping assembly (43).

Clause 2: The load-handling device (31) of clause 1, wherein the raising and lowering assembly (51) comprises a plurality of timing pulleys (53, 55, 59, 61, 63, 65), timing belts (54, 60, 64) and/or gears configured to transfer rotation from an output of the single motor (52, 222, 232), to raise and lower the container-gripping assembly (43).

Clause 3: The load-handling device (31) of clause 1 or clause 2, wherein the raising and lowering assembly (51) comprises a rotatable shaft (56) on which are mounted multiple components of the raising and lowering assembly (51) which are configured to rotate together, with the shaft (56).

Clause 4: The load-handling device (31) of clause 3, wherein the raising and lowering assembly (51) comprises a plurality of spools (57, 67, 62, 68), each spool of the plurality of spools carrying a lifting tether having a first end anchored to the container-gripping assembly (43) and a second end anchored to the spool, the plurality of spools driven by the single motor (52) via the plurality of timing pulleys (53, 55, 59, 61, 63, 65), timing belts (54, 60, 64) and/or gears to raise and lower the container-gripping assembly (43).

Clause 5: The load handling device (31) of clause 4, wherein the plurality of spools comprises a first set of spools (57, 67) and a second set of spools (62, 68), wherein the first set of spools (57, 67) are mounted to the shaft (56) such that the shaft (56) is common to the first set of spools (57, 67), wherein the shaft (56) is rotated by being connected to the single motor (52) via at least one of the plurality of timing pulleys (53, 55, 59, 61, 63, 65), timing belts (54, 60, 64) and/or gears, and wherein the second set of spools (62, 68) are driven by the single motor (52) by being connected to the shaft (56) via one or more of the plurality of timing pulleys (53, 55, 59, 61, 63, 65), timing belts (54, 60, 64) and/or gears.

Clause 6: The load handling device (31) of clause 5, wherein the plurality of timing pulleys comprises a drive pulley (55) and a first set (59, 63) and second set (61, 65) of timing pulleys, the drive pulley (55) and the first set of timing pulleys (59, 63) are mounted on the shaft (56) common to the first set of spools (57, 67) such that rotation of the shaft (56) by the single motor (52) by connection to the drive pulley (55) drives the first set of spools (57, 67).

Clause 7: The load handling device (31) of clause 6, wherein the first set of timing pulleys (59, 63) are connected to the second set of timing pulleys (61, 65) via one or more of the plurality of timing belts (54, 60, 64) such that rotation of the shaft (56) by the single motor (52) by connection to the drive pulley (55) drives the second set of spools (62, 68).

Clause 8: The load handling device (31) of clause 6 or clause 7, wherein the drive pulley (55) is one of the first set of pulleys.

Clause 9: The load handling device (31) of any of clauses 5 to 8, in which the single motor (52) drives the first set of spools (57, 67) and the second set of spools (62, 68) in synchronisation.

Clause 10: The load handling device (31) of any of clauses 4 to 9, wherein at least one timing pulley of the plurality of timing pulleys is mounted to at least one spool of the plurality of spools.

Clause 11: The load handling device (31) of clause 10, wherein the at least one of the plurality of spools comprises an adjustable mechanism for rotatably adjusting the at least one spool about its axis of rotation relative to the at least one timing pulley of the plurality of timing pulleys.

Clause 12: The load-handling device (31) of any of clauses 2 to 11, wherein the raising and lowering assembly (51) comprises one or more tensioners (66) configured to maintain or adjust the tension in the timing belts (54, 60, 64).

Clause 13: The load-handling device (31) of any of the preceding clauses, wherein the raising and lowering assembly (51) comprises a frame structure (69) which is releasably mountable on the body (33) of the load-handling device (31).

Clause 14: The load-handling device (31) of any of the preceding clauses, wherein an output of the single motor (52, 222, 232) is connected to the container-gripping assembly (43) via a gearing mechanism.

Clause 15: The load-handling device (31) of any of the preceding clauses, wherein an aperture is defined by the raising and lowering assembly (51), the aperture being sized and configured to allow a component to be inserted into or removed from the body (33) of the bot (31) through the aperture.

Clause 16: The load-handling device (31) of any of the preceding clauses, comprising one or more connectors (41, 185) configured to connect the output of the single motor (52, 222, 232) and the container-gripping assembly (43).

Clause 17: The load-handling device (31) of clause 16, wherein the one or more connectors (41, 185) pass around or over one or more guides or pulleys (73, 253, 254).

Clause 18: The load-handling device (31) of clause 16 or clause 17, wherein the one or more connectors (41, 185) are configured to be unwound from and wound onto one or more spools or drums (57, 62, 67, 68, 71, 75, 221, 231, 251) by the single motor (52, 222, 232).

Clause 19: The load-handling device (31) of any of the preceding clauses, wherein the raising and lowering assembly (51) includes a communications cable, the single motor (52, 222, 232) being configured to raise and lower a distal end of the communications cable with the container-gripping assembly (43).

Clause 20: A method for performance by a load-handling device (31) of any of clauses 1 to 19, comprising:

causing rotation in a first direction of an output of the single motor (52), thereby lowering the container-gripping assembly (43) to a container (9) stacked in a stack (11) of containers (9) in the storage structure (1);

causing the container-gripping assembly (43) to engage the container (9) such that the container (9) can be raised and lowered by the container-gripping assembly (43);

causing rotation in a second direction of the output of the single motor (52), thereby raising the container-gripping assembly (43) and the engaged container (9).

Clause 21: The method of clause 20, comprising:
accommodating at least part of the engaged container (9) in the container-receiving space in the lower portion (47) of the body (33) of the load-handling device (31).

Clause 22: The method of clause 20 or 21, comprising:
causing the wheel-positioning mechanism to engage only the first set of wheels (35) with the first set of tracks (17); and
causing the first set of wheels (35) to rotate and move the load-handling device (31) in the first direction along the tracks (17).

Clause 23: The method of clause 22, comprising:
causing the wheel-positioning mechanism to engage only the second set of wheels (37) with the second set of tracks (19); and
causing the second set of wheels (35) to rotate and move the load-handling device (31) in the second direction along the tracks (19).

Clause 24: The method of clause 23, comprising:
causing rotation in the first direction of the output of the single motor (52), thereby lowering the container-gripping assembly (43) and the engaged container (9).

Clause 25: The method of clause 24, comprising:
causing the wheel-positioning mechanism to engage the first set of wheels (35) with the first set of tracks (17).

Clause 26: A storage and retrieval system, comprising:
a storage structure (1) configured to store containers (9) in stacks (11) beneath a first set of tracks (17) extending in a first direction and second set of tracks (19) extending in a second direction; and
a plurality of load-handling devices (31) as described in any of clauses 1 to 19.

Clause 27: The storage and retrieval system of clause 26, wherein the plurality of load-handling devices (31) are configured to carry out the method of any of clauses 20 to 25.

The invention claimed is:

1. A load-handling device for lifting and moving containers stacked in stacks in a storage structure, the storage structure including, above the stacks of containers, a first set of tracks extending in a first direction and a second set of tracks extending in a second direction which is transverse to the first direction, the load-handling device being configured to move on the tracks above the stacks, the load-handling device comprising:
a body having an upper portion and a lower portion, the upper portion being configured to house one or more operation components, the lower portion being arranged beneath the upper portion, the lower portion including a container-receiving space for accommodating at least part of a container;
a wheel assembly arranged to support the body, the wheel assembly including a first set of wheels for engaging with the first set of tracks to guide movement of the load-handling device in the first direction and a second set of wheels for engaging with the second set of tracks to guide movement of the load-handling device in the second direction;
a wheel-positioning mechanism for selectively engaging either the first set of wheels with the first set of tracks or the second set of wheels with the second set of tracks, the wheel-positioning mechanism being configured to raise or lower the first set of wheels or the second set of wheels relative to the body, thereby enabling the load-handling device to selectively move in either the first direction or the second direction across the tracks of the storage structure; and
a container-lifting mechanism including a container-gripping assembly configured to releasably grip a container, and a raising and lowering assembly configured to raise and lower the container-gripping assembly,
wherein the raising and lowering assembly includes a single motor configured to raise and lower the container-gripping assembly, and
wherein the raising and lowering assembly comprises:
a rotatable shaft on which are mounted multiple components of the raising and lowering assembly which are configured to rotate together, with the shaft, and
wherein the single motor is mounted outboard of the shaft.

2. The load-handling device as claimed in claim 1, wherein the raising and lowering assembly comprises:
a plurality of timing pulleys, timing belts and/or gears configured to transfer rotation from an output of the single motor, to raise and lower the container-gripping assembly.

3. The load-handling device as claimed in claim 2, wherein the raising and lowering assembly comprises:
one or more tensioners configured to maintain or adjust the tension in the timing belts.

4. The load-handling device as claimed in claim 1, wherein the raising and lowering assembly comprises:
a plurality of spools, each spool of the plurality of spools carrying a lifting tether having a first end anchored to the container-gripping assembly and a second end anchored to the spool, the plurality of spools being connected to be driven by the single motor via the plurality of timing pulleys timing, belts and/or gears to raise and lower the container-gripping assembly.

5. The load handling device of claim 4, wherein the plurality of spools comprises:
a first set of spools and a second set of spools, wherein the first set of spools are mounted to the shaft such that the shaft is common to the first set of spools, wherein the shaft is arranged to be rotated by being connected to the single motor via at least one of the plurality of timing pulleys, timing belts and/or gears, and wherein the second set of spools are arranged to be driven by the single motor by being connected to the shaft via one or more of the plurality of timing pulleys, timing belts, and/or gears.

6. The load handling device of claim 5, wherein the plurality of timing pulleys comprises:
a drive pulley and a first set and second set of timing pulleys, the drive pulley and the first set of timing pulleys being mounted on the shaft common to the first set of spools such that rotation of the shaft by the single motor by connection to the drive pulley will drive the first set of spools.

7. The load handling device of claim 6, wherein the first set of timing pulleys are connected to the second set of timing pulleys via one or more of the plurality of timing belts such that rotation of the shaft by the single motor by connection to the drive pulley will drive the second set of spools.

8. The load handling device of claim 6, wherein the drive pulley is one of the first set of pulleys.

9. The load handling device of claim 8, wherein the connection of the single motor to the drive pulley comprises:
a first timing pulley and a single belt, the single belt being tensioned around the first timing pulley and the drive pulley, and one of the second set of timing pulleys, thereby being configured to drive rotation of the first set of spools and the second set of spools.

10. The load handling device of claim 5, in which the single motor drives the first set of spools and the second set of spools in synchronisation.

11. The load handling device of claim 4, wherein at least one timing pulley of the plurality of timing pulleys is mounted to at least one spool of the plurality of spools.

12. The load handling device of claim 11, wherein the at least one of the plurality of spools comprises:
an adjustable mechanism for rotatably adjusting the at least one spool about its axis of rotation relative to the at least one timing pulley of the plurality of timing pulleys.

13. The load-handling device as claimed in claim 1, wherein the raising and lowering assembly comprises:
a frame structure which is releasably mountable on the body of the load-handling device.

14. The load-handling device as claimed in claim 1, wherein an output of the single motor is connected to the container-gripping assembly via a gearing mechanism.

15. The load-handling device as claimed in claim 1, wherein an aperture is defined by the raising and lowering assembly, the aperture being sized and configured to allow a component to be inserted into or removed from the body through the aperture.

16. A storage and retrieval system, comprising:
a storage structure configured to store containers in stacks beneath the first set of tracks extending in a first direction and the second set of tracks extending in a second direction; and
a plurality of load-handling devices as claimed in claim 1.

17. A method for lifting and moving containers by a load-handling device, the load handling device including a body having an upper portion and a lower portion, the upper portion being configured to house one or more operation components, the lower portion being arranged beneath the upper portion, the lower portion including a container-receiving space for accommodating at least part of a container;
a wheel assembly arranged to support the body, the wheel assembly including a first set of wheels for engaging with the first set of tracks to guide movement of the load-handling device in the first direction and a second set of wheels for engaging with the second set of tracks to guide movement of the load-handling device in the second direction;
a wheel-positioning mechanism for selectively engaging either the first set of wheels with the first set of tracks or the second set of wheels with the second set of tracks, the wheel-positioning mechanism being configured to raise or lower the first set of wheels or the second set of wheels relative to the body, thereby enabling the load-handling device to selectively move in either the first direction or the second direction across the tracks of the storage structure; and
a container-lifting mechanism including a container-gripping assembly configured to releasably grip a container, and a raising and lowering assembly configured to raise and lower the container-gripping assembly,
wherein the raising and lowering assembly includes a single motor configured to raise and lower the container-gripping assembly,
wherein the raising and lowering assembly comprises:
a rotatable shaft on which are mounted multiple components of the raising and lowering assembly which are configured to rotate together, with the shaft, and
wherein the single motor is mounted outboard of the shaft the method comprising:
causing rotation in a first direction of an output of the single motor, thereby lowering the container-gripping assembly of a load handling device to a container stacked in a stack of containers in a storage structure located beneath the load-handling device;
causing the container-gripping assembly to engage the container; and
causing rotation in a second direction of the output of the single motor, thereby raising the container-gripping assembly and the engaged container by operation of the single motor used to lower the container-gripping assembly.

\* \* \* \* \*